United States Patent [19]
Christensen et al.

[11] Patent Number: 5,557,482
[45] Date of Patent: Sep. 17, 1996

[54] MULTIPATH CHANNEL APPARATUS AND METHOD FOR DATA STORAGE DEVICES AND COMMUNICATIONS SYSTEMS WHEREIN A DATA PATH IS SELECTED BASED ON ERRORS

[75] Inventors: Thomas C. Christensen; Earl A. Cunningham, both of Rochester, Minn.

[73] Assignee: International Business Machines Corporation, Armonk, N.Y.

[21] Appl. No.: 359,215

[22] Filed: Dec. 19, 1994

[51] Int. Cl.[6] .................................................. G11B 5/09
[52] U.S. Cl. ................................ 360/53; 360/46; 360/51; 360/61
[58] Field of Search ................................ 360/53, 61, 46, 360/51; 375/349; 369/53; 371/68.1

[56] References Cited

U.S. PATENT DOCUMENTS

| | | | |
|---|---|---|---|
| 5,299,070 | 3/1994 | Takahashi et al. | 360/61 X |
| 5,414,722 | 5/1995 | Tollum. | |
| 5,434,886 | 7/1995 | Kazawa et al. | 375/290 X |

FOREIGN PATENT DOCUMENTS

| | | |
|---|---|---|
| 0249064 | 12/1987 | European Pat. Off. . |
| 2168575 | 6/1986 | United Kingdom . |

OTHER PUBLICATIONS

S. Dines, "Digital Partial Response Technology Comes to Magnetic Disk Drives", Computer Technology Review, vol. 13, No. 6, May 1, 1993, pp. 40, 42, 44–45.

*Primary Examiner*—W. Chris Kim
*Attorney, Agent, or Firm*—Matthew J. Bussan; Richard E. Billion

[57] ABSTRACT

A multipath channel apparatus for a data storage device wherein data is stored on a storage medium and is read from the storage medium by a transducer or for a data communications system wherein data is transmitted to a receiver. A data channel having a plurality of data paths is operatively connected to the transducer to receive data read from the storage medium by the transducer, or operatively connected to receive data demodulated by the receiver or base band data received by the receiver. Preferably, each of the data paths has a differing parameter value. An error checking unit checks customer and redundancy data from each of the data paths. A selecting unit, which is responsive to the error checking unit, selects data from one of the data paths. In a preferred embodiment, the data stored on a storage medium includes a data field and an error correcting code field, and the customer and redundancy data from each of the data paths is checked using a calculated error correcting code sydrome.

4 Claims, 18 Drawing Sheets

MULTIPATH CHANNEL APPARATUS AND METHOD FOR DATA STORAGE DEVICES AND COMMUNICATIONS SYSTEMS WHEREIN A DATA PATH IS SELECTED BASED ON ERRORS

BACKGROUND OF THE INVENTION

1. Field of the Invention

The present invention relates to an apparatus and method for recovering data recorded on a storage medium or received by a communications system, and more particularly to an apparatus and method that divides a data channel into a plurality of data paths, wherein data from one of the data paths is selected based on a favorable error correcting code (ECC) syndrome, for example.

2. Description of the Related Art

Two aspects of data storage devices, such as magnetic and optical disk drives and tape drives, are under constant pressure for enhancement. One is the continuing effort to increase storage density and the other is the continuing effort to increase throughput by using higher speed components and improved techniques.

Storage density is improved by increasing the bit densities and by narrower, more closely spaced data tracks. These changes result in a reduction of the size of each bit which requires that the reading and writing capabilities be upgraded to higher levels of performance to maintain the same standard of reliability previously attained.

Among the characteristics that are designed to optimize drive performance during the read mode is delta-V, which is the voltage change per unit time threshold that is used to discriminate between data and noise signals on the channel. It has been common practice to set the delta-V value for optimum performance. However, the delta-V value that provides the best performance varies from transducer to transducer and, in a disk drive, also with the radial position of the transducer location which is a function of the speed of the head relative to the disk surface. To solve this problem, U.S. Pat. No. 4,821,125 discloses disk drive channel circuitry which uses variable values for delta-V that can be set on a head to head and track to track basis. Such channel circuitry uses only a single delta-V value at a time, however, and thus requires data to be re-read for each delta-V value when errors are encountered. This disadvantageously decreases throughput because the disk must be rotated into the transducer location so that data can be re-read from the disk.

Another characteristic that is designed to optimize drive performance during the read mode is the timing window in which a bit is read from a medium. It has been common practice to center the window for optimum performance using variable frequency oscillator (VFO) window centering circuitry. However, the position of the timing window that provides the best performance can vary due to bit shift, which is caused by, for example, different transducer/disk combinations and tolerances in the VFO window centering circuitry. To solve this problem, disk drive channel circuitry is known that uses a variable position timing window that can be shifted either early or late. U.S. Pat. No. 4,958,243 and "WINDOW-SHIFTING MECHANISM IN DATA SEPARATOR", IBM Technical Disclosure Bulletin, Vol. 30, No. 6, November 1987 disclose typical channel circuitry of this type. Such channel circuitry shifts the timing window for a whole data string, however, and thus requires data to be re-read for each desired shift of the timing window. This disadvantageously decreases throughput because the disk must be rotated into the transducer location so that data can be re-read from the disk.

Decreases in throughput are especially disruptive in multimedia applications where uninterrupted read data flow is of great significance. Decreased throughput in multimedia applications manifests itself in jerky visual motion or stopped scan updates in mid-screen while data is re-read.

U.S. Pat. No. 3,537,084 discloses a data storage timing system that compensates for bit shift driven by intersymbol interference, i.e., the first and last changes in a plurality of successive changes in the direction of magnetization will upon reading respectively result in an early-occurring and late-occurring data bit frame. The disclosed system uses one unique path for detection delay, one detection for framing data without any delay and another detection for framing the data with a delay equal to the anticipated intersymbol interference driven bit shift. Framing is strobed by a clock that is delayed a fraction of the anticipated intersymbol interference driven bit shift. The framing path is selected based on an inflexible set consecutive bit criteria, i.e., whether the bit that was read last corresponds to a change in the direction of magnetization or no change in the direction of magnetization. This system only compensates for intersymbol interference driven bit shift using the unique set consecutive bit criteria rules.

For a communications system, data that is incorrectly received and demodulated, can be re-transmitted by the communications system. However, this disadvantageously decreases the throughput of the communications system while the data is re-transmitted. This phenomenon is disruptive for modems, closed circuit cable systems and the like. This phenomenon is especially disruptive in multimedia applications where throughput is of great importance and manifests itself in jerky visual motion or stopped scan updates in mid-screen while data is re-transmitted.

SUMMARY OF THE INVENTION

An object of the present invention is to provide an enhanced data channel apparatus and method for a data storage device that optimizes performance during a read mode without requiring data to be re-read.

Another object of the present invention is to provide an enhanced data channel apparatus and method for a data storage device that optimizes performance during a read mode without requiring data to be re-read for each delta-V value.

Yet another object of the present invention is to provide an enhanced data channel apparatus and method for a data storage device that corrects for many types of bit shift, not just bit shift driven by intersymbol interference, during a read mode without requiring data to be re-read for each shifted timing window.

A further object of the present invention is to provide an enhanced data channel apparatus and method for a data storage device that optimizes performance during a read mode using plural delta-V values and shifted timing windows without requiring data to be re-read.

A still further object of the present invention is to provide an enhanced data channel apparatus and method for a communications system that optimizes performance during a receive mode without requiring data to be re-transmitted.

These and other objects of the present invention are achieved by a multipath channel apparatus for a data storage device wherein data is stored on a storage medium and is read from the storage medium by a transducer, or for a data communications system wherein data is received by a receiver. A data channel having a plurality of data paths is operatively connected to the transducer to receive data signals read from the storage medium by the transducer, or operatively connected to the receiver to receive data signals demodulated by the receiver or base band data signals received by the receiver. In each case the data signals include customer and redundancy data. An error checking unit checks the customer and redundancy data from each of the plurality of data paths. A selecting unit, which is responsive to the error checking unit, selects data from one of the plurality of data paths. Because the selection criteria is preferably performance outcome based, the present invention can adapt to changes caused by noise, coercivity change, media defect, head instability and the like—and is not limited to just correcting bit shift errors driven by intersymbol interference.

In a preferred embodiment of the present invention, each of the plurality of data paths has a differing parameter, and the customer and redundancy data from each of the plurality of data paths is checked using a calculated error correcting code syndrome which provides information on any errors contained in the read signal. The selection of one of the plurality of data paths may be made by choosing data with no errors, or with small errors that can be connected electronically "on the fly."

The present invention performs "electronic rereads" of data in the plurality of data paths simultaneously, rather than physically rereading data from the storage medium or retransmitting data in the communications system. Because the "electronic rereads" of the present invention are performed in a plurality of data paths, the "electronic rereads" can be performed concurrently and require no more revolutions of a disk medium, for example, than does a conventional read.

The performance of "electronic rereads" in real time lends itself to multimedia applications, for example, where errors negatively impact throughput.

BRIEF DESCRIPTION OF THE DRAWINGS

The present invention together with the above and other objects and advantages can best be understood from the following detailed description of the embodiments of the invention illustrated in the drawings, wherein like reference numerals denote like elements and wherein.

DESCRIPTION OF THE PREFERRED EMBODIMENTS

Figure 1:
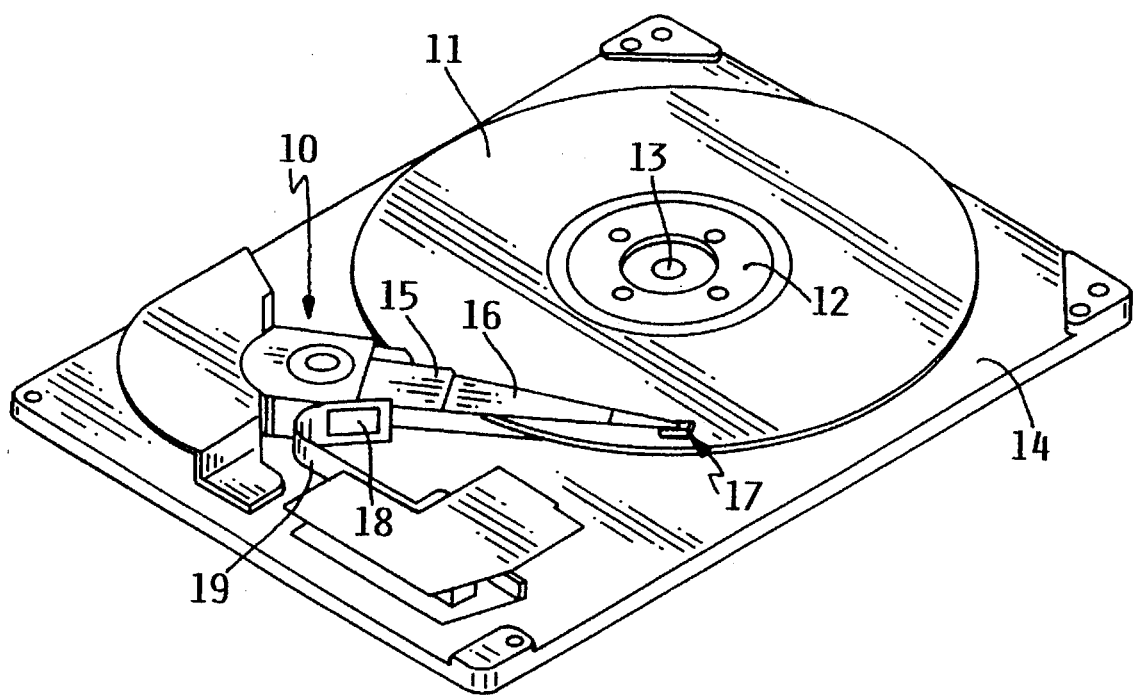
FIG. 1 is a perspective view of a typical magnetic disk storage device illustrating principal mechanical elements; a track on a magnetic disk shown in FIG. 1.

FIG. 1 illustrates a typical magnetic disk drive wherein a rotary actuator 10 accesses a magnetic disk 11. The magnetic disk 11 is mounted on a hub 12, which is attached to a spindle shaft 13. The magnetic disk 11, hub 12, spindle shaft 13 and the rotor of a spindle drive motor (not shown) rotate in unison with the support of beatings (not shown) mounted in a base 14. Magnetic disk 11 includes a plurality of tracks for storing data. The tracks are arrayed in a concentric or spiral pattern around spindle shaft 13, for example.

The rotary actuator 10 includes an arm 15 attached to a resilient suspension 16 that carries a transducer 17, such as a slider carrying a magnetoresistive (MR) read head and an inductive write head. The rotary actuator 10 is driven by a voice coil (not shown) to effect radial inward and outward motion of transducer 17 relative to magnetic disk 11, and thereby access the tracks on magnetic disk 11. The transducer 17 is electrically connected via lead wires (not shown) to an arm electronics module 18 mounted on a flexible cable 19, which is attached to arm 15. Alternatively, the arm electronics module can be attached to base 14. The arm electronics module 18 is electrically connected to the remainder of the disk drive circuitry by conductors in a flexible cable 19.

The present invention is not limited to use with magnetic disk storage devices, but can be used with any data storage device, including magnetic and optical disk drives and tape drives, or any communications system.

Figure 2:
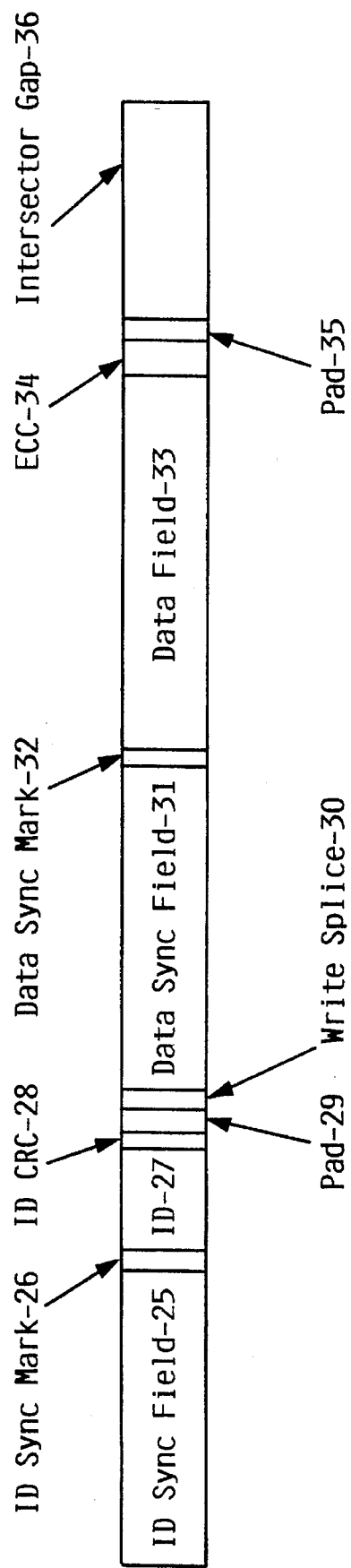
FIG. 2 is a schematic diagram of a typical sector architecture byte allocation of a track on a magnetic disk shown in FIG. 1.

FIG. 2 is a schematic diagram of a typical sector architecture byte allocation of each track on magnetic disk 11. The sector architecture byte allocation shown in FIG. 2 includes an eleven byte identification (ID) sync field 25 for synchronizing timing circuits, a one byte ID sync mark 26 for marking the start of an ID field, a six byte ID field 27 to identify a sector, a two byte ID cyclic redundancy check (CRC) field 28 containing an error sensing code, a three byte pad 29 and a one byte write splice 30 for protecting the ID field when data is written, an eleven byte data sync field 31 for synchronizing timing circuits for data, a one byte data sync mark 32 for marking the start of a data field, a five hundred twenty byte data field 33 representing a sector of data, a six byte error correcting code (ECC) field 34, a three byte pad 35 for motor speed variation and a fourteen byte intersector gap 36 for write recovery.

The present invention is not limited to use with the sector architecture byte allocation shown in FIG. 2, but can be used with any data storage architecture that includes redundant data such as an ECC, CRC or any other error detection or correction code.

The ECC field 34 is conventionally used both for correction and error detection. The error detection is required to reduce the probability of miscorrected data to less than the hard error rate. When no correction is attempted, all the bytes of ECC field 34 are available for error detection. If one correction is attempted, then two less bytes per interleave are available for error detection. If double burst correction is attempted, then four less bytes per interleave are available for error detection. Each two byte reduction causes the miscorrect possibility to be 65,536 ($2^{16}$) times higher, e.g., if double burst correction is attempted the possibility of miscorrect increases by more than 4 billion times.

The present invention allows multiple techniques of data processing, filtering, detection and/or standardization to be applied in parallel data paths during a single pass read. The error detection power of ECC field 34, for example, can be used to select one of the data paths that has correct data. This can provide a significantly lower error rate as compared to that of a conventionally adjusted data channel.

Figure 3A:
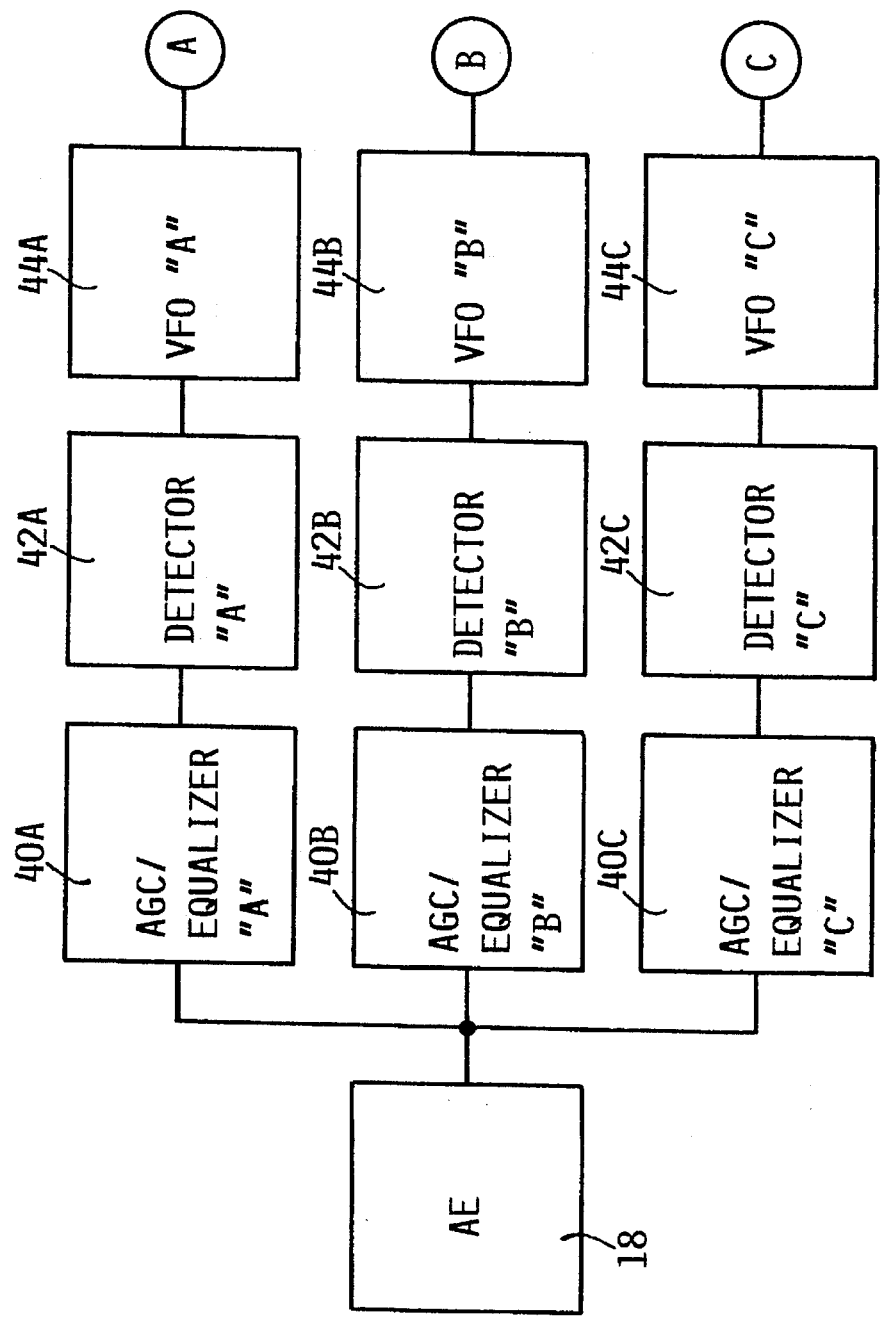
FIG. 3(A)–3(B) is a schematic block diagram of a multipath channel apparatus for a data storage device according to a first embodiment of the present invention.
Figure 3B:
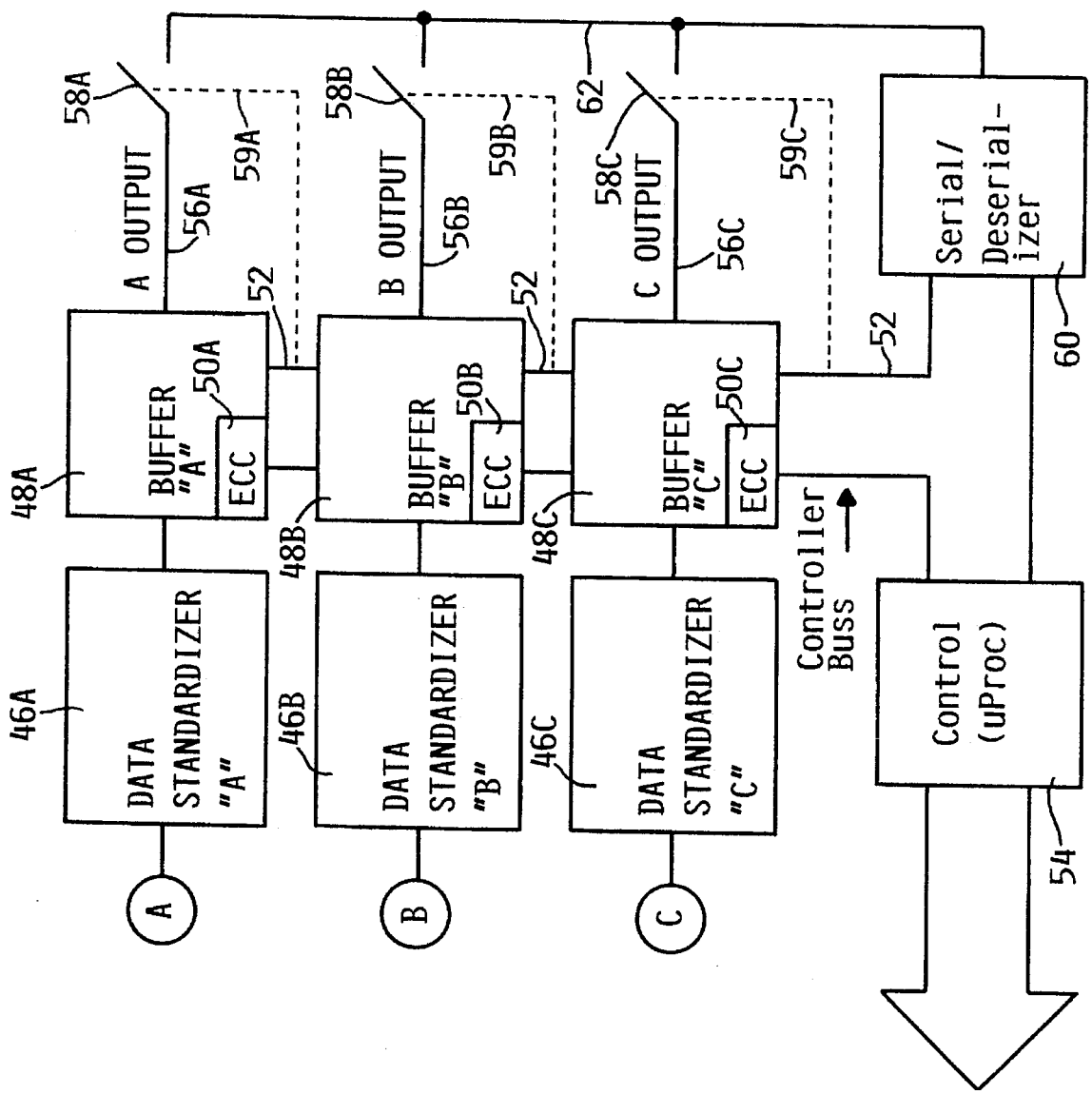

FIG. 3 is a schematic block diagram of a multipath channel apparatus for a data storage device according to a first embodiment of the present invention. The arm electronics (AE) module 18 is usually carried on the actuator as shown in FIG. 1. The AE module 18 provides the initial high amplification of the read signal voltage from transducer 17.

Automatic gain control (AGC)/equalizer modules 40A, 40B and 40C receive the amplified read signal from AE module 18. In each of AGC/equalizer modules 40A, 40B and 40C, this signal is then amplified, held to a constant amplitude and sent through a filter (not shown) to be output. The AGC/equalizer modules 40A, 40B and 40C have differing parameter values. That is, AGC/equalizer module 40A has a different bandwidth and/or equalization than each of AGC/equalizer modules 40B and 40C, and AGC/equalizer module 40B has a different bandwidth and/or equalization than each of AGC/equalizer modules 40A and 40C. The bandwidth and equalization of AGC/equalizer module 40B are chosen to optimize drive performance under normal conditions, for example, and the bandwidths and equalizations of AGC/equalizer modules 40A and 40C are chosen to optimize drive performance under other conditions.

The output of AGC/equalizer module 40A is sent to a detector module 42A. Likewise, the outputs of AGC/equalizer modules 40B and 40C are respectively sent to detector modules 42B and 42C. Detector modules 42A, 42B and 42C each respectively transform the amplified linear signals from respective AGC/equalizer modules 40A, 40B and 40C into a corresponding series of digital pulses. All waveform peaks are detected and a series of filtering circuits are employed to find the resultant valid data peaks. Two key criteria are applied to all the peaks identified by the differentiation, delta-V and "V threshold", The circuitry responsible for these two functions, along with some combinational logic, provide the discrimination between data and extraneous peaks necessary to pass a clean string of data pulses to VFO modules 44A, 44B and 44C. Detector modules 42A, 42B and 42C have differing parameter values. That is, detector module 42A has a different delta-V and/or "V threshold" than detector modules 42B and 42C, and detector module 42B has a different delta-V and/or "V threshold" than detector modules 42A and 42C. The delta-V and "V threshold" of detector module 42B are chosen to optimize drive performance under normal conditions, for example, and the delta-V and "V threshold" of detector modules 42A and 42C are chosen to optimize drive performance under other conditions.

The VFO modules 44A, 44B and 44C, in combination with data standardizer modules 46A, 46B and 46C, respectively establish three different definitions of the detection window center. The VFO modules 44A, 44B and 44C each constantly compare a string of pulses to its framing oscillator output. In the read mode the comparison pulse string is the string of data pulses from detector modules 42A, 42B and 42C. Adjustments made to the oscillator frequency are proportional to the measured phase error of each compared pulse. The adjustment magnitude per sampled error or response time is determined by which of two modes VFO modules 44A, 44B and 44C are in, i.e., a fast sync mode or the read mode. Prior to receiving actual data, VFO modules 44A, 44B and 44C receive a series of constant frequency pulses that make up data sync field 31. The data sync field 31 is written at the same time as data field 33 and is used to prepare or set up VFO modules 44A, 44B and 44C to accept the actual data from data field 33 and redundant data from ECC field 34. When data sync field 31 appears at the input of VFO modules 44A, 44B and 44C, VFO modules 44A, 44B and 44C are placed in the fast sync mode. During the time that VFO modules 44A, 44B and 44C are in this mode, VFO modules 44A, 44B and 44C react faster to maximize the oscillator adjustment per sampled phase error and therefore minimize the time to lock VFO modules 44A, 44B and 44C to this data. For the remaining time VFO modules 44A, 44B and 44C are in the read mode. During a last part of data sync field 31 and all through the data field 33 and EEC field 34, the response of VFO modules 44A, 44B and 44C is slowed to provide optimum frequency compensation.

The VFO modules 44A, 44B and 44C respectively provide data standardizer modules 46A, 46B and 46C with VFO clocks and detected data, i.e., data pulses from detector modules 42A, 42B and 42C. The VFO clocks received from VFO modules 44A, 44B and 44C are offset by data standardizer modules to varying degrees, resulting in a different read clock for use by respective data standardizer modules 46A, 46B and 46C. That is, the read clock used by data standardizer modules 46A is different than those used by data standardizer modules 46B and 46C, and the read clock used by data standardizer module 46B is different than those used by data standardizer modules 46A and 46C. Each read clock is synchronous with disk rotation, but the center of the detection window with respect to disk rotation is defined differently by each of the data standardizer modules 46A, 46B and 46C. For example, the detection window defined by the read clock used in data standardizer module 44B may be centered, i.e., merely the VFO clock provided by VFO module 44B; the detection window defined by the read clock used by data standardizer modules 46A is shifted early, i.e., the VFO clock provided by VFO module 44A is offset earlier by data standardizer module 46A; and the detection window defined by the read clock used by data standardizer modules 46C is shifted later, i.e., the VFO clock provided by VFO module 44C is delayed by data standardizer module 46C. The read clock used by data standardizer module 46B is chosen to optimize drive performance under normal conditions, for example, and the read clocks used by data standardizer modules 46A and 46C are chosen to optimize drive performance under other conditions.

The bandwidth and equalization of AGC/equalizer modules 40A, 40B and 40C; the delta-V and "V threshold" of detector modules 42A, 42B and 42C; and the read clock used by data standardizer modules 46A, 46B and 46C are preferably chosen to optimize drive performance under different conditions. For example, the bandwidth and equalization of AGC/equalizer module 40B, the delta-V and "V threshold" of detector module 42B, and the read clock used by data standardizer module 46B are chosen to optimize drive performance under normal conditions; the bandwidth and equalization of AGC/equalizer module 40A, the delta-V and "V threshold" of detector module 42A, and the read clock used by data standardizer module 46A are chosen to optimize drive performance under other conditions; and the bandwidth and equalization of AGC/equalizer module 40C, the delta-V and "V threshold" of detector module 42C, and the read clock used by data standardizer module are chosen to optimize drive performance under still other conditions. For example, during the design of the drive, the values of these parameters of the separate paths are determined so that optimum performance can be achieved for low, nominal and high tolerance transducers used to read data off various media.

The data standardizer module 46A compares the detected data provided by VFO module 44A against the detection window defined by its read clock to generate standardized data, which is the received and reconstructed encoded data written on the media. This standardized data is then digitally decoded by data standardizer module 46A to the form of customer and redundancy data for transmission, along with the read clock, to a buffer module 48A. Likewise, data standardizer module 46B compares the detected data provided by VFO module 44B against the detection window defined by its read clock to generate standardized data, and decodes the standardized data for transmission to a buffer module 48B, along with its read clock; and data standardizer module 46C compares the detected data provided by VFO module 44C against the detection window defined its read clock to generate standardized data, and decodes the standardized data for transmission to a buffer module 48C, along with its read clock.

Buffer modules 48A, 48B and 48C temporarily store a sector of the standardized and decoded data (i.e., the standardized and decoded data corresponding to data field 33 and ECC field 34) respectively received from data standardizer modules 46A, 46B and 46C. In addition, buffer modules 48A, 48B and 48C respectively contain ECC syndrome modules 50A, 50B and 50C that calculate and temporarily store ECC syndromes in a conventional manner. The ECC syndrome module 50A calculates and stores the ECC syndrome for the sector of standardized and decoded data stored in buffer module 48A. Likewise, ECC syndrome module 50B calculates and stores the ECC syndrome for the sector Of standardized and decoded data stored in buffer module 48B, and ECC syndrome module 50C calculates and stores the ECC syndrome for the sector of standardized and decoded data stored in buffer module 48C.

The buffer modules 48A, 48B and 48C are connected via a controller bus 52 to a controller module 54, as are ECC syndrome modules 50A, 50B and 50C. The controller module 54 polls the calculated ECC syndromes stored in ECC syndrome modules 50A, 50B and 50C. The controller module 54 compares the calculated ECC syndrome stored in ECC syndrome module 50B against an interpretation table to provide error information about the data stored in buffer module 48B. Likewise, the controller module 54 can compare the calculated ECC syndrome stored in ECC syndrome module 50A against an interpretation table to provide error information about the data stored in buffer module 48A, and can compare the calculated ECC syndrome stored in ECC syndrome module 50C against an interpretation table to provide error information about the data stored in buffer module 48C. For example, if all of the bytes of the ECC syndrome are zeroes, then this is typically interpreted to represent no errors in the data. With small errors, typically some of the bytes of the ECC syndrome identify the location of an error in the data, and other bytes of the ECC syndrome identify which bits need to be changed to correct the error.

Buffer modules 48A, 48B and 48C also respectively have outputs 56A, 56B and 56C and switches 58A, 58B and 58C, for selectively outputting the sectors of standardized and decoded data respectively stored in buffer modules 48A, 48B and 48C. The position of each of switches 58A, 58B and 58C, i.e., either open or closed, is individually controlled by controller module 54 via controller bus 52 and switch leads 59A, 59B and 59C. The controller module 54 controls the position of switches 58A, 58B and 58C based on the comparisons of the error information, derived for each of the parallel data paths, to a prioritization list.

The prioritization list may typically start with a preference for zero errors in a nominal data path. If there are errors in the nominal data path, then the preference would typically change to no errors in another of the data paths. If errors occur in all of the data paths, then it may be desirable to change the preference to one correctable error in the nominal data path. Likewise, if there is more than one error in the nominal data path, then it may be desirable to change the preference to one correctable error in another of the data paths. The optimal prioritization order depends on how significant the error is versus a delay time. For example, a few incorrect pixels in a video display is typically less important than a pause on motion in the video display. The reverse is typically true for digital data. Thus in video usage, the preference is typically to use higher levels of ECC correction before re-reads are tried. The reverse is typically true for digital data.

When switch 58A is closed and switches 58B and 58C are open, the sector of standardized and decoded data stored in buffer module 48A is provided to a serial/deserializer module 60 via output 56A and a connection line 62. Likewise, when switch 58B is closed and switches 58A and 58C are open, the sector of standardized and decoded data stored in buffer module 48B is provided to the serial/deserializer module 60; and when switch 58C is closed and switches 58A and 58B are open, the sector of standardized and decoded data stored in buffer module 48C is provided to a serial/deserializer module 60.

Preferably, the standardized and decoded data stored in the selected one of buffer modules 48A, 48B and 48C is clocked out of the selected buffer module before or as the next sector of standardized and decoded data is clocked into buffer modules 48A, 48B and 48C using the read clock provided by data standardizer modules 46A, 46B and 46C. Alteratively, buffer modules 48A, 48B and 48C are large enough to accommodate a plurality of sectors of the standardized and decoded data.

The serial/deserializer module 60 deserializes the received serial data and provides the resulting deserialized data to the using system through controller bus 52 and controller module 54.

Figure 4A:
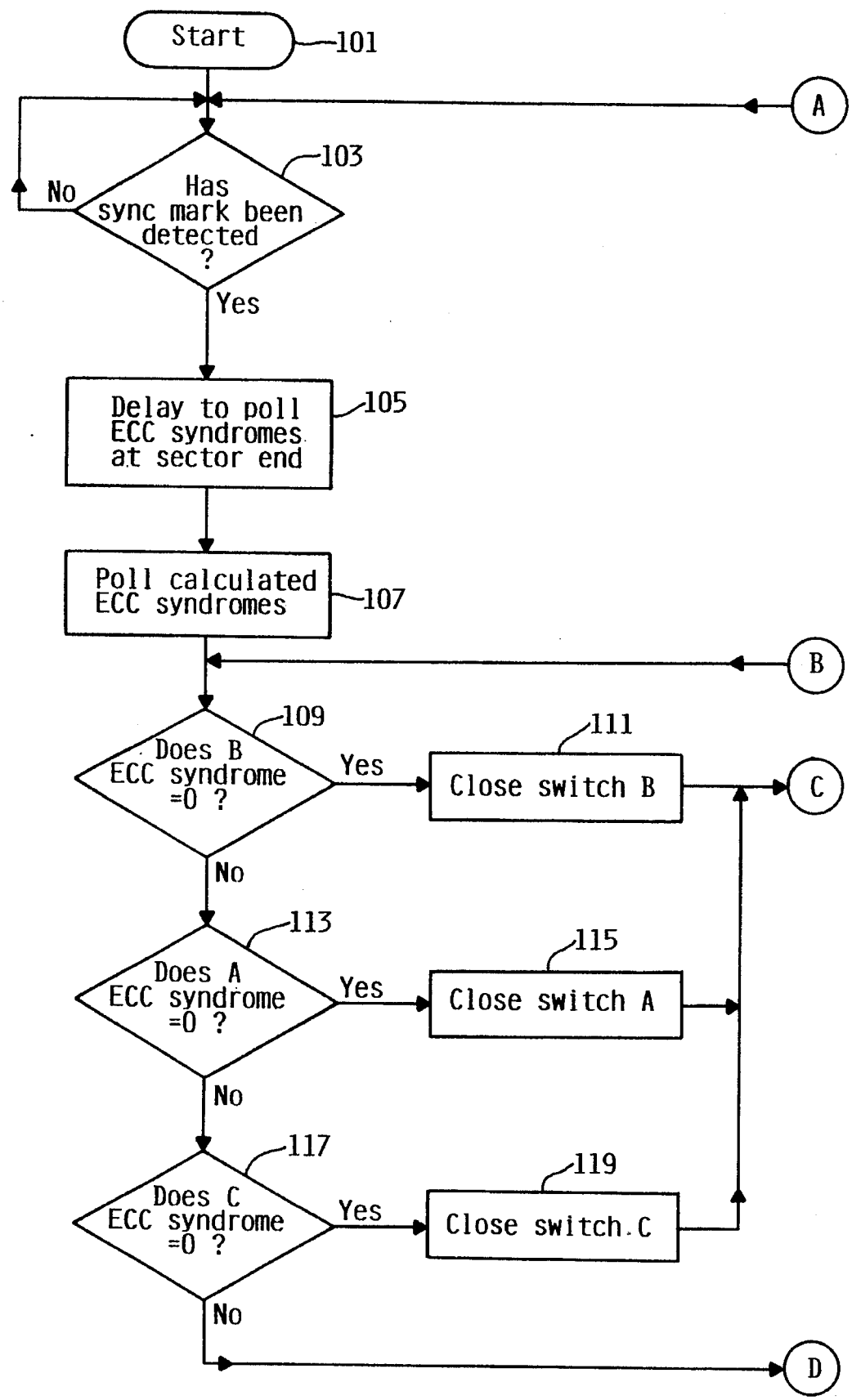
FIG. 4(A)–4(B) is a flow chart showing a polling procedure performed by the multipath channel apparatus shown in FIG. 3.
Figure 4B:
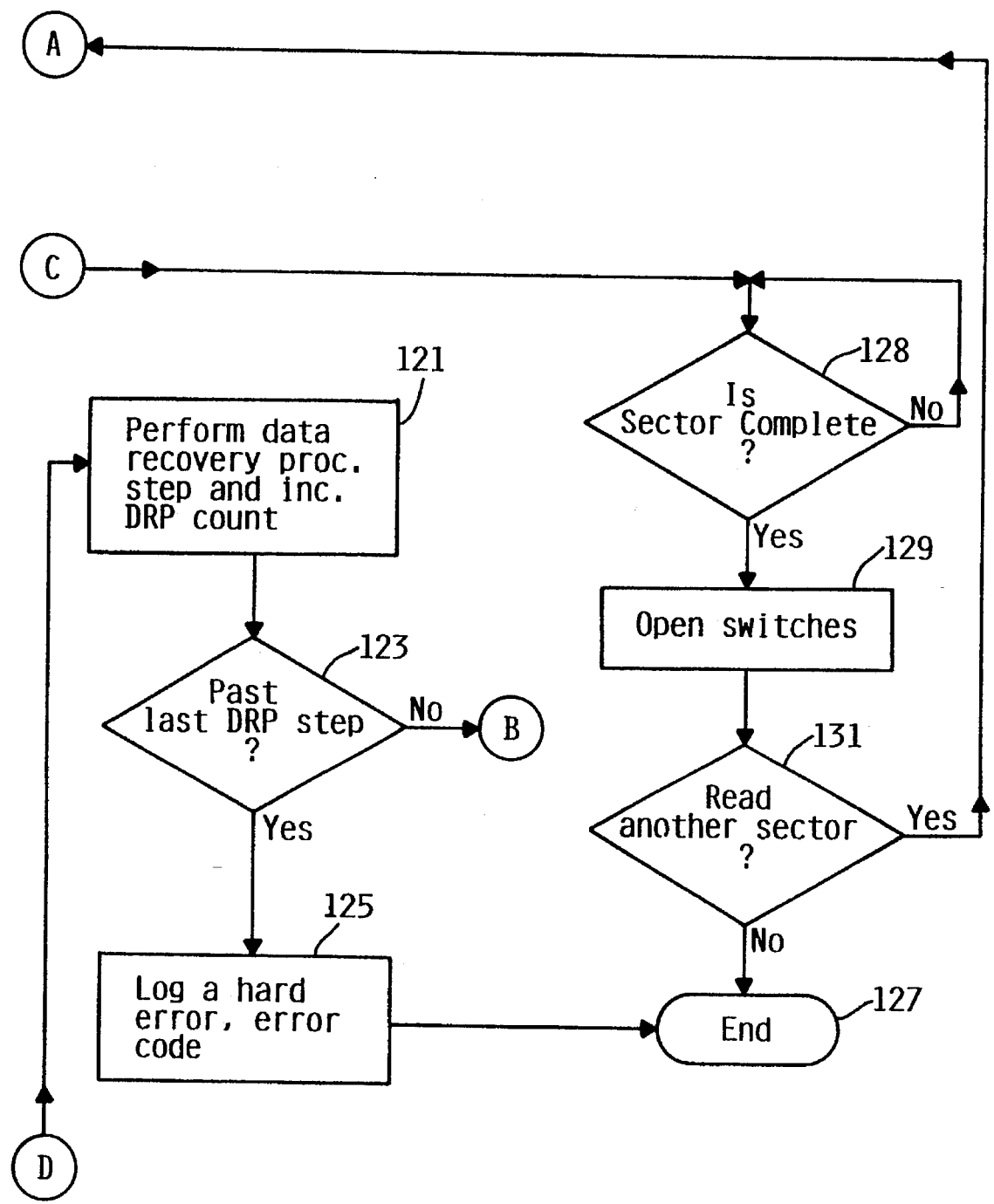

FIG. 4 is a flow chart showing the polling procedure performed by controller module 54 for a case where all the power of the ECC code is used for detection, i.e., the ECC code is not used for correction. The start of the polling procedure is denoted as step 101. In step 103, the polling procedure queries whether a data sync mark 32 has been detected. If a data sync mark 32 is detected in step 103, then the polling procedure proceeds to step 105, which produces a delay so that the ECC syndromes are polled at the end of the sector. If a data sync mark 32 is not detected in step 103, then step 103 is repeated. After the delay of step 105, the calculated ECC syndromes stored in ECC syndrome modules 50A, 50B and 50C are polled in step 107.

After the polling of step 107, the polling procedure queries whether the calculated ECC syndrome stored in ECC syndrome module 50B is zero, indicating no error, in step 109. If there is a match in step 109, switch 58B is closed (switches 58A and 58C are open) in step 111.

If there is not a match in step 109, the polling procedure queries whether the calculated ECC syndrome stored in ECC syndrome module 50A is zero, indicating no error, in step 113. If there is a match in step 113, switch 58A is closed (switches 58B and 58C are open) in step 115.

If there is not a match in step 113, the polling procedure queries whether the calculated ECC syndrome stored in ECC syndrome module 50C is zero, indicating no error, in step 117. If there is a match in step 117, switch 58C is closed (switches 58A and 58B are open) in step 119.

If there is not a match in step 117, a step of a conventional data recovery procedure (DRP) is performed and a DRP count is increased by one in step 121. Then, in step 123 the polling procedure queries whether a last step of the conventional DRP has been completed. If the last DRP step has been completed, then a hard (noncorrectable) error and an error code are logged in step 125 and the polling procedure ends in step 127. On the other hand, if the last DRP step has not been completed, then step 109 is repeated but with the DRP step having been performed.

Thus a conventional DRP can be used with the present invention, which increases the recovery odds at each DRP step. Each DRP step will require data to be re-read, however. Thus, it is preferable to apply the present invention before the DRP, thereby increasing the probability of reading the data correctly in the first instance and significantly reducing the number of re-reads required. Moreover, the differing parameters of the present invention, e.g., bandwidth, equalization, delta-V, "V threshold", and/or detection window offset, can be adjusted in the DRP to improve the recovery odds of more extreme errors. A DRP need not be used with the present invention, however.

When switches 58B, 58A and 58C are respectively closed in steps 111, 115 and 119, then the polling procedure queries whether the sector is complete in step 128. If the sector has not been completed, step 128 is repeated. If the sector has been completed, each of switches 58A, 58B and 58C are opened in step 129. Then, in step 131 the polling procedure queries whether there is another sector to be read. If there is another sector to be read, then step 103 is repeated. If there is no other sector to be read, then the polling procedure ends in step 127.

The flow chart of FIG. 4 may also be modified so that after the test for zero errors in steps 109, 113 and 117, the polling procedure repeats through steps 109, 113 and 117 but with a test for one error. This procedure may be repeated for two or more errors also, according to an optimized priority list of tests to be performed before resorting to the conventional DRP. Of course any error must be corrected before the data is passed through switch 58A, 58B or 58C.

Although separate AGC/equalizer modules 40A, 40B and 40C, detector modules 42A, 42B and 42C, and VFO modules 44A, 44B and 44C are shown in FIG. 3, this need not be the case. Preferably, these modules are made separate in each data path only if the different parameters thereof will satisfactorily assist in optimizing drive performance. The use of modules that are common to at least some of the data paths reduces any additional space and/or cost requirements of the present invention.

In a modification of the first embodiment, sections of the sectors from the buffer modules 48A, 48B and 48C are used to construct sequences containing one data zone, e.g., the front half of a sector, and another data zone, e.g., the last half of the sector. The data is combined electronically until a sector is formed that is without error. ECC syndromes may be generated from the constructed sectors, for example, so that only correctly constructed data from the buffer modules 48A, 48B and 48C is used in reconstructing the original data.

Figure 5:
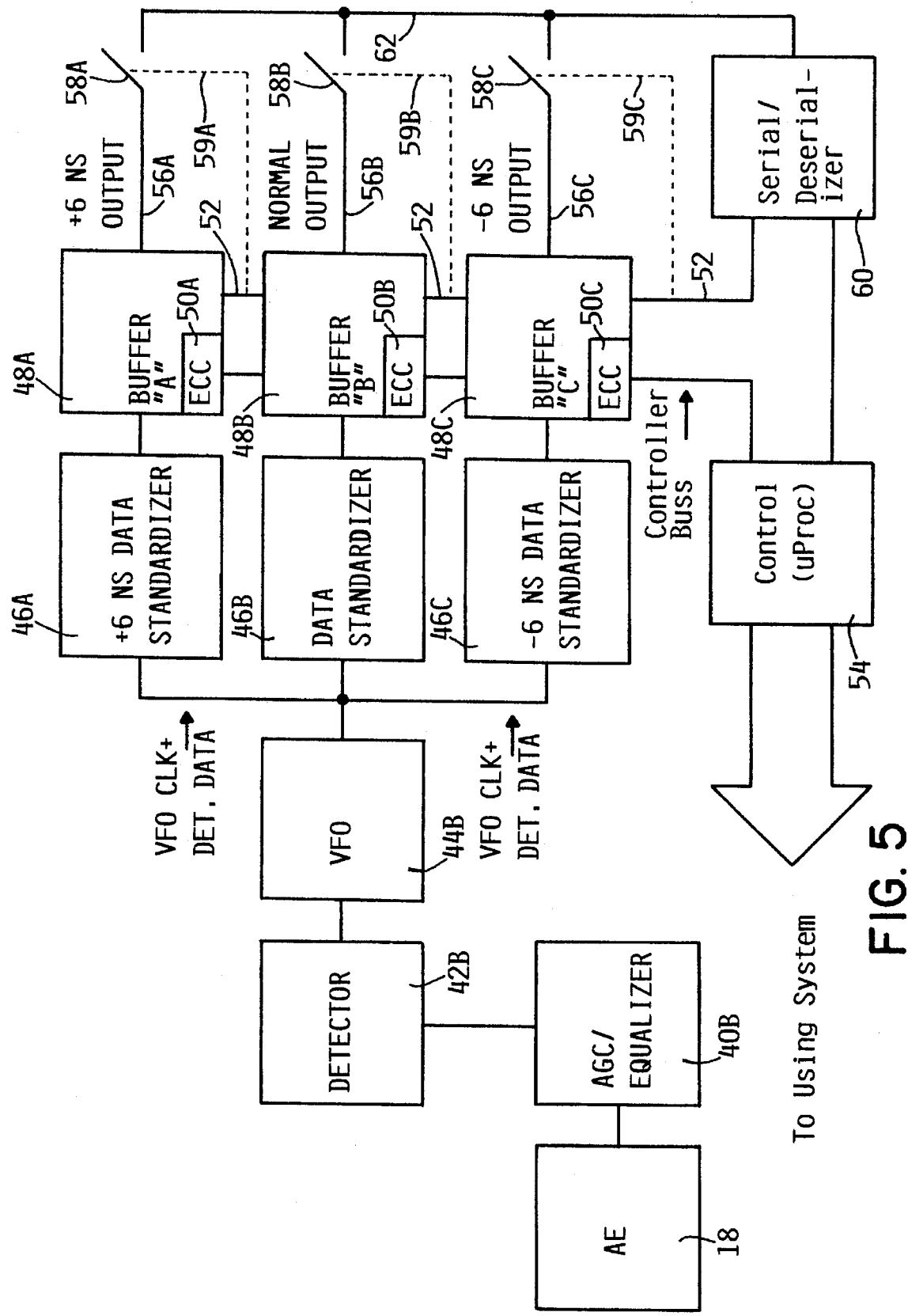
FIG. 5 is a schematic block diagram of a multipath channel apparatus for a data storage device according to a second embodiment of the present invention, wherein the data paths use a common automatic gain control (AGC)/equalizer module, a common detector module and a common variable frequency oscillator (VFO) module.

FIG. 5 is a schematic block diagram of a multipath channel apparatus for data storage devices according to a second embodiment of the present invention. The second embodiment is identical to the first embodiment shown in FIG. 3 except that each of the data paths uses a common AGC/equalizer module 40B, detector module 42B and VFO module 44B. In the second embodiment, VFO module 44B provides data standardizer modules 46A, 46B and 46C with a VFO clock and detected data, i.e., data pulses from detector module 42B. Preferably, as shown in FIG. 5, data standardizer module 46B uses a read clock that is centered, data standardizer module 46A uses a read clock that is offset earlier (preferably, 4% to 20% of the total detection window size, e.g., six nanoseconds for a forty-two nanosecond window) relative to center, and data standardizer module 46C uses a read clock that is offset later (preferably, 4% to 20% of the total detection window size, e.g., six nanoseconds for a forty-two nanosecond window) relative to center.

An example with only electronic noise follows to illustrate advantages of the present invention. In this example, a first data path that includes data standardizer 46B is nominally adjusted to have a six sigma margin on each side for all of the data bits, e.g., 4096 bits per sector (assuming a 512 byte sector). One sigma corresponds to the RMS voltage of the noise. A second data path that includes data standardizer 46A is advanced by one sigma, thereby creating a five sigma margin on one side and a seven sigma margin on the other side. A third data path that includes data standardizer 46C is delayed by one sigma, thereby creating a seven sigma margin on one side and a five sigma margin on the other side.

A five sigma margin (single sided) leads to a bit error rate of 2.9 E-7, a six sigma margin (single sided) leads to a bit error rate of 1.0 E-9, and a seven sigma margin (single sided) leads to an error rate of 1.3 E12.

Thus the sector failure rate for the nominal, first data path is 8.2 E-6 (4096 bits * (1.0 E-9) * (2sides)). The sector failure rate for the advanced, second data path, if used alone, is 1.2 E-3 (4096 bits * (2.9 E-7+1.3 E-12)), the left term being the failure rate of the five sigma margin side and the right term being the failure rate of the seven sigma side. Likewise, the sector failure rate for the delayed, third data path, if used alone, is 1.2 E-3.

If the electronic noise does not exceed the six sigma margin, the nominal data path correctly reads the data. If the electronic noise exceeds seven sigma, then even the advanced and delayed data paths will not read the data correctly. However, this happens far less often than when the noise exceeds a six sigma margin, i.e., of the errors that exceed a six sigma margin, the fraction that also exceed a seven sigma margin is 0.13% ((1.3 E-12)/(1.0E-9)=0.0013). Thus 99.87% of the failing bits that caused a sector failure of the nominal data path will be read correctly by the advanced or delayed data paths. For the remaining 4095 bits in the sector, the probability that another bit transition will be outside a detection window is 0.12% (4095 bits * (2.9 E-7 +1.3 E-12)=0.0012). Thus there is a total of 0.25% (0.13% +0.12%) chance that the advanced or delayed data paths will fail to correct a failure of the nominal data path. Therefore, in this example the error rate is 400 times lower than that of the nominal data path, if used alone.

Moreover, the miscorrect rate can be lowered because of the high probability that a failure of the nominal data path will be corrected by the advanced or delayed data paths, without resorting to the correction capability of the ECC syndrome and the higher miscorrect rate associated therewith. Also, because the nominal data path can be checked for correctness first so that the advanced or delayed data paths are used only when an error occurs in the nominal data path, the use of the advanced or delayed data paths does not cause the detection capability of the ECC syndrome to be checked more often, and thus will not increase the misconnect rate.

The present invention can also solve problems related to media noise and defects, which can be more severe than the problems related to electronic noise. Electronic noise is different on every re-read, and thus there is a good chance of recovery by re-reading the data. However, with media noise and defects, any distortion in the written waveform is "locked in" the media, and will not change upon every re-read. Conventionally, when media noise and defects are severe, the only hope for recovery is to use the correction capability of ECC or wait until electronic noise counteracts the distortion. In a case where the written waveform is shifted outside the proper detection window, then the electronic noise will rarely counteract the distortion even after many re-reads. However, a channel having advanced and delayed data paths according to the present invention can read the data correctly most of the time on the first read. In fact, the more deviation from true electronic noise a data storage device has, the more significant the improvement provided by the present invention. Because the present invention can reduce the impact of media defects, the data density of the media can be increased or the media rejection rate can be reduced to lower the cost of the media.

Although a channel apparatus having three data paths is described in the first and second embodiments, the present invention is not so limited. A channel apparatus according to the present invention may alternatively have two or more than three data paths.

Preferably, all of the data paths are fabricated on a single chip. This reduces any additional space and/or cost requirements of the present invention.

Figure 6A:
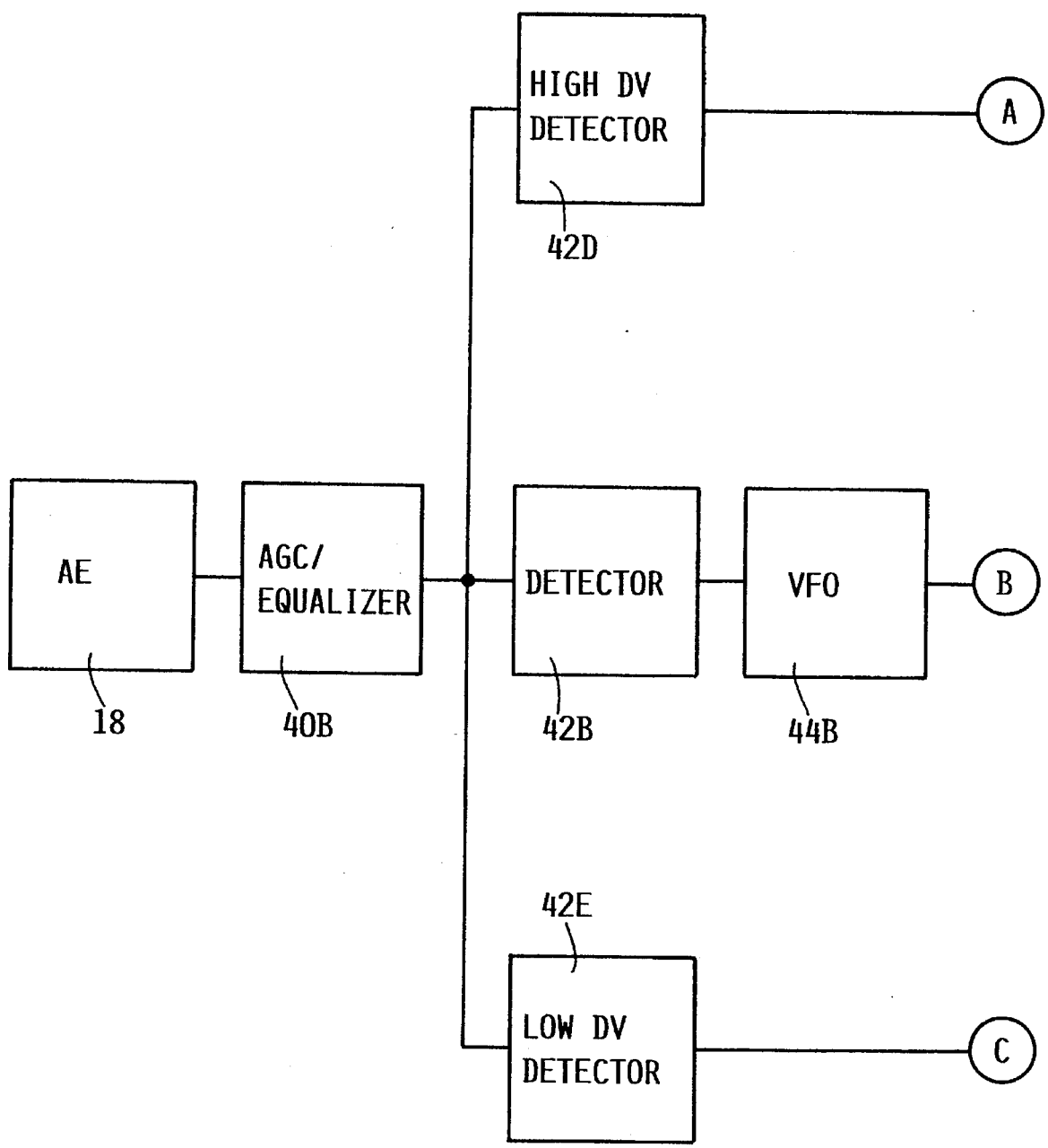
FIG. 6(A)–6(B) is a schematic block diagram of a multipath channel apparatus for a data storage device according to a third embodiment of the present invention, wherein recovery from amplitude errors and shifted bit errors occurs along separate data paths.
Figure 6B:
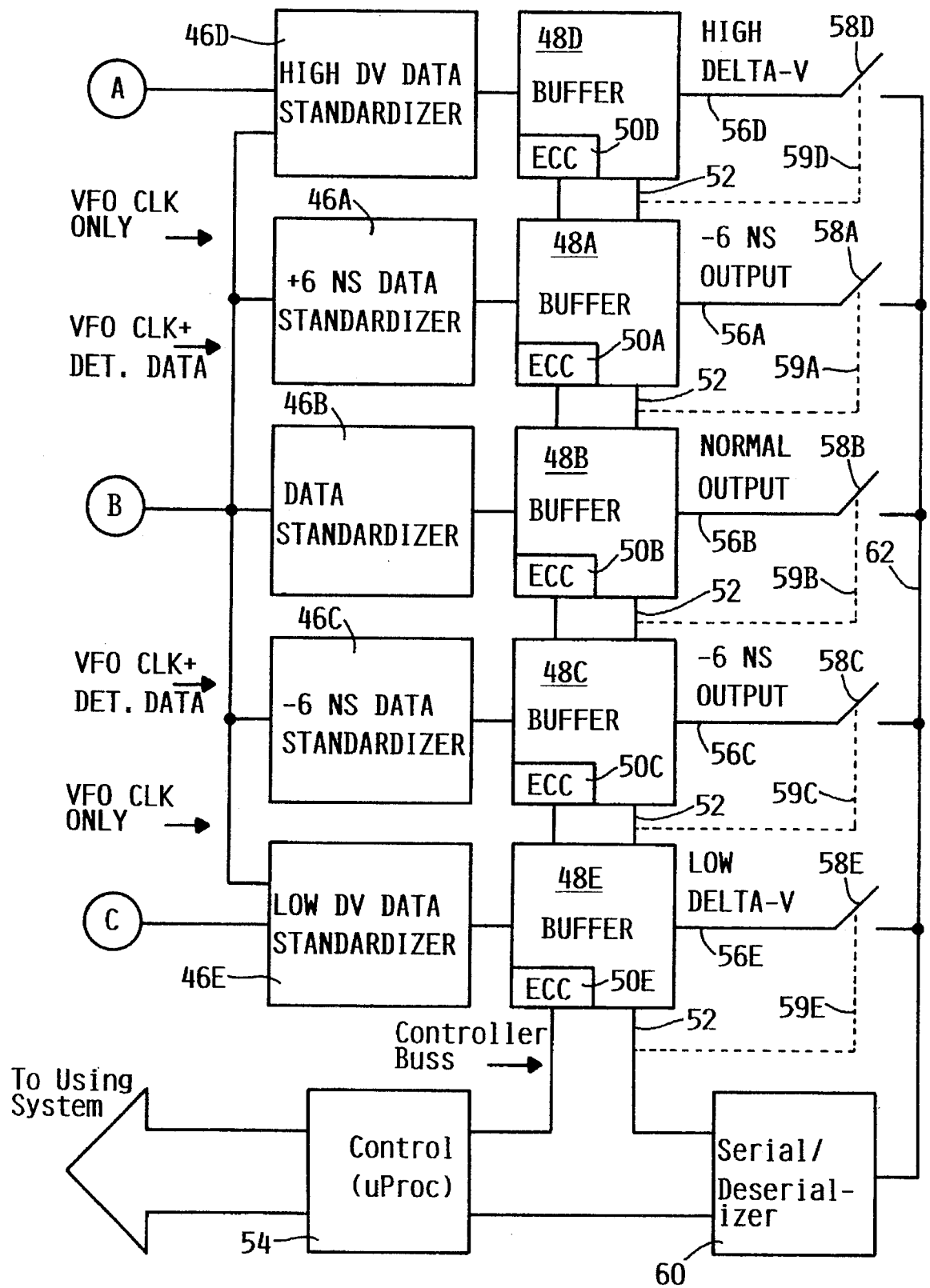

FIG. 6 is a schematic block diagram of a multipath channel apparatus for data storage devices according to a third embodiment of the present, wherein recovery from amplitude errors and shifted bit errors occurs along separate data paths. The third embodiment is identical to the second embodiment shown in FIG. 5 except that two additional data paths are included for recovery from amplitude errors.

In the third embodiment, the output of AGC/equalizer module 40B is sent to detector modules 42B, 42D and 42E.

Detector modules 42B, 42D and 42E each respectively transform the amplified linear signals from AGC/equalizer module 40B into a corresponding series of digital pulses. All waveform peaks are detected and a series of filtering circuits are employed to find the resultant valid data peaks. Two key criteria are applied to all the peaks identified by the differentiation, delta-V and "V threshold", The circuitry responsible for these two functions, along with some combinational logic, provide the discrimination between data and extraneous peaks necessary to pass a clean string of data pulses to VFO module 44B and data standardizer modules 46D and. 46E. Detector modules 42B, 42D and 42E have differing parameter values. That is, detector module 42B has a different delta-V and/or "V threshold" than detector modules 42D and 42E, and detector module 42D has a different delta-V and/or "V threshold" than detector modules 42B and 42E. Preferably, as shown in FIG. 6, the delta-V and "V threshold" of detector module 42B are chosen to optimize drive performance under normal conditions, the delta-V and "V threshold" of detector module 42D are chosen to optimize drive performance when the resolution of the output of AGC/equalizer 40B is higher than normal, and the delta-V and "V threshold" of detector module 42E are chosen to optimize drive performance when the resolution of the output of AGC/equalizer is lower than normal.

Also in the third embodiment, VFO module 44B provides data standardizer modules 46A, 46B, 46C, 46D and 46E with a VFO clock, and provides data standardizer modules 46A, 46B and 46C with detected data, i.e., data pulses from detector module 42B. That is VFO module 44B provides data standardizer modules 46D and 46E only with the VFO clock. The data standardizer module 46D compares the detected data provided by detector module 42D against the detection window defined by the VFO clock from VFO module 44B to generate standardized and decoded data for transmission to a buffer module 48D, along with its clock. Likewise, data standardizer module 46E compares the detected data provided by detector module 42E against the detection window defined by the VFO clock from VFO module 44B to generate standardized and decoded data for transmission to a buffer module 48E, along with its clock.

Buffer modules 48D and 48E temporarily store a sector of the standardized and decoded data (i.e., the standardized and decoded data corresponding to data field 33 and ECC field 34) respectively received from data standardizer modules 46D and 46E. In addition, buffer modules 48D and 48E respectively contain ECC syndrome modules 50D and 50E that calculate and temporarily store ECC syndromes. The ECC syndrome module 50D calculates and stores the ECC syndrome for the sector of standardized and decoded data stored in buffer module 48D. Likewise, ECC syndrome module 50E calculates and stores the ECC syndrome for the sector of standardized and decoded data stored in buffer module 48E.

The buffer modules 48D and 48E are connected via controller bus 52 to controller module 54, as are ECC syndrome modules 50D and 50E. The controller module 54 polls the calculated ECC syndromes stored in ECC syndrome modules 50A, 50B, 50C, 50D and 50E. Preferably, the controller module 54 first compares the calculated ECC syndrome stored in ECC syndrome module 50B to zero, which indicates no error. Likewise, the controller module 54 can respectively compare the calculated ECC syndrome stored in ECC syndrome modules 50A, 50C, 50D and 50E to zero, preferably in that order.

Buffer modules 48D and 48E respectively have outputs 56D and 56E and switches 58D and 58E, for selectively outputting the sectors of standardized and decoded data respectively stored in buffer modules 48D and 48E. The position of each of switches 58D and 58E, i.e., either open or closed, is individually controlled by controller module 54 via controller bus 52 and switch leads 59D and 59E. The controller module 54 controls the position of switches 58A, 58B, 58C, 58D and 58E based on the comparisons of the calculated ECC syndromes stored in ECC modules 50A, 50B, 50C, 50D and 50E to zero. Only one of switches 58A, 58B, 58C, 58D and 58E is closed at one time, and thus the sector of standardized and decoded data stored in the corresponding buffer module is provided to a serial/deserializer module 60 via connection line 62.

Preferably, the standardized and decoded data stored in the selected one of buffer modules 48A, 48B, 48C, 48D and 48E is clocked out of the selected buffer module before or as the next sector of standardized and decoded data is clocked into buffer modules 48A, 48B, 48C, 48D and 48E using the clocks provided by data standardizer modules 46A, 46B, 46C, 46D and 46E. Alternatively, buffer modules 48A, 48B, 48C, 48D and 48E are large enough to accommodate a plurality of sectors of the standardized and decoded data.

Adding additional data paths for two additional delta-V choices allows for recovering from amplitude errors and shifted bit errors along separate data paths. These are the two modes of bit error for a peak detect channel.

The present invention in not restricted to peak detect channel implementations. Partial response (PR) channels can also use multiple paths and combinations of offsets to address key problems with magnetic data, including amplitude and phase shifts which result in data errors.

Typically, a partial-response maximum-likelihood (PRML) recording channel uses class IV partial-response (PR) signals accomplished by a PR-IV filter function. Data to be written is applied to an encoder for providing a modulation coded output having predefined run length constraints, such as for minimum and maximum number of consecutive zeroes and the maximum run length of zeros in the even and odd recorded sequences in the overall recorded sequence. A precoder follows the encoder described by a $1/(1-D^2)$ operation, where D is a unit delay operator. A PRML precomp coupled to the precoder provides a modulated width binary pulse signal applied to a write circuit that provides the modulated write current for writing to the disk surface.

Figure 7A:
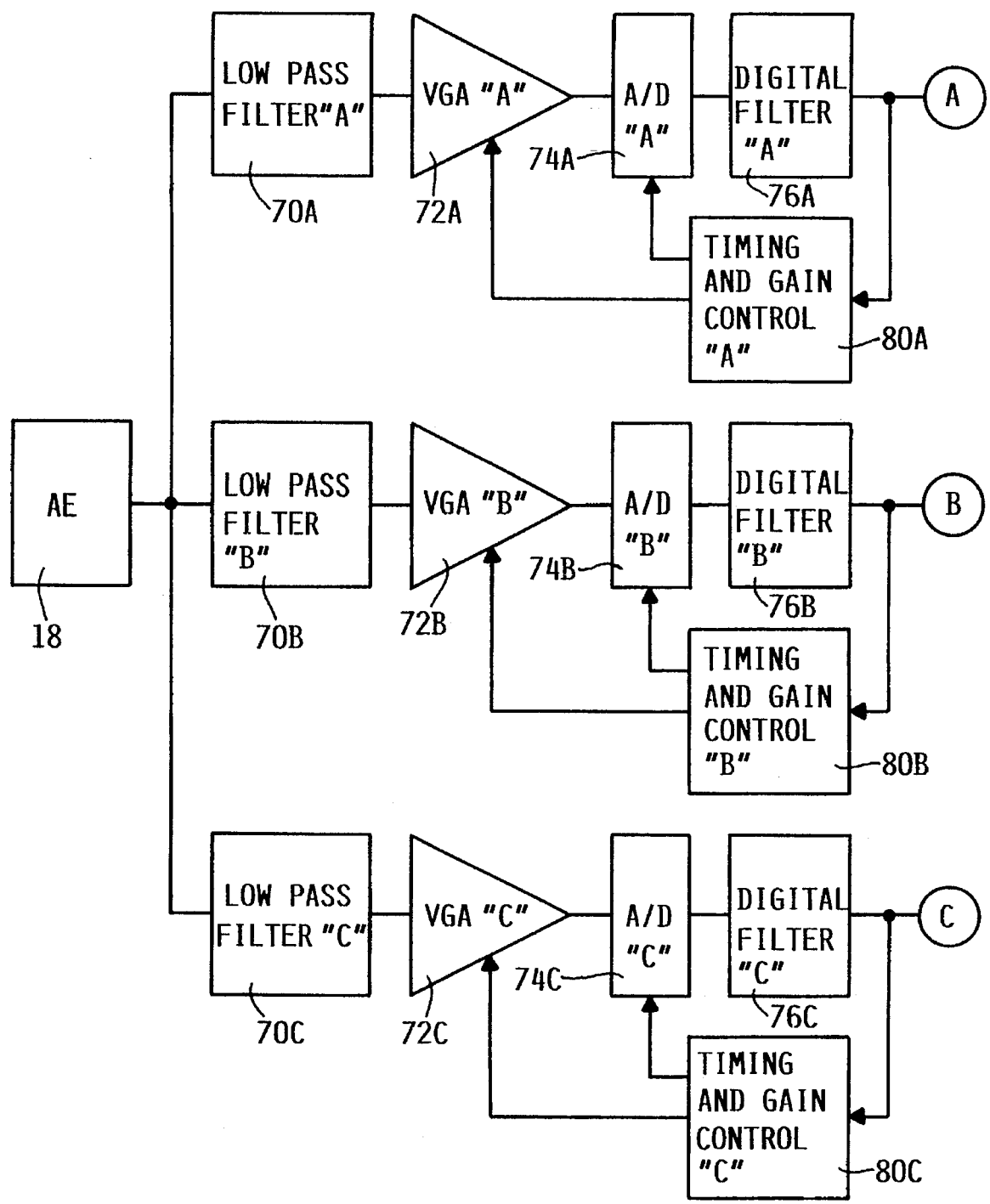
FIG. 7(A)–7(B) is a schematic block diagram of a multipath channel apparatus for a data storage device according to a fourth embodiment of the present invention using partial-response maximum-likelihood (PRML) data paths.
Figure 7B:
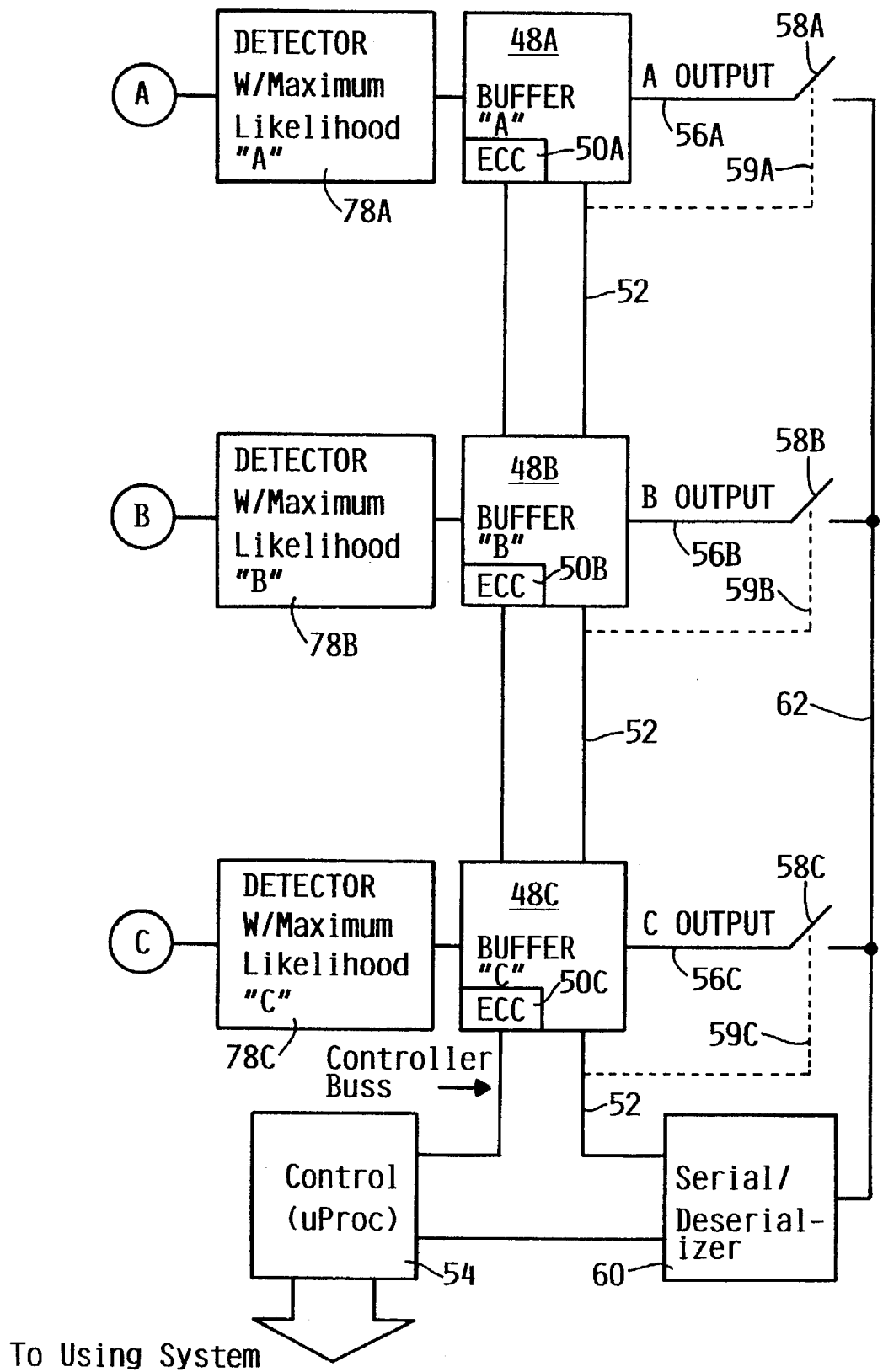

FIG. 7 is a schematic block diagram of a multipath channel apparatus for data storage devices according to a fourth embodiment of the present invention using partial-response maximum-likelihood (PRML) data paths. An analog read signal is obtained from the AE module 18 described by a $(1-D^2)$ operation, where D is again a unit delay operator. Low pass filter modules 70A, 70B and 70C receive the amplified read signal from AE module 18. The filtered read signals are respectively applied to variable gain amplifier (VGA) modules 72A, 72B and. 72C. The amplified read signals are respectively applied to analog to digital (A/D) converter modules 74A, 74B and 74C that provide, for example, sixty-four possible 6-bit sampled values.

The samples of A/D converter modules 74A, 74B and 74C are respectively applied to digital filter modules 76A, 76B and 76C, such as a ten tap finite impulse response (FIR) digital filter. The filtered signals from digital filter modules 76A, 76B and 76C are respectively applied to detector modules 78A, 78B and 78C, and are respectively applied to timing and gain control modules 80A, 80B and 80C. The detector modules 78A, 78B and 78C each includes, for example, a Viterbi decoder (not shown) coupled to a 0/4,4 decoder to complete the maximum-likelihood (ML) detection process for data read back. The timing and gain control modules 80A, 80B and 80C respectively provide a gain and ac coupling pole control signal to VGA modules 72A, 72B and 72C, and respectively provide a timing control signal to A/D modules 74A, 74B and 74C.

The low pass filter modules 70A, 70B and 70C, VGA modules 72A, 72B and 72C, A/D converter modules 74A, 74B and 74C, digital filter modules 76A, 76B and 76C, detector modules 78A, 78B and 78C and/or timing and gain control modules 80A, 80B and 80C have differing parameter values. Preferably, the parameter values of low pass filter module 70B, VGA module 72B, A/D converter module 74B, digital filter module 76B, detector module 78B and timing and gain control module 80B are chosen to optimize drive performance under normal conditions; and the parameter values of low pass filter modules 70A and 70C, VGA modules 72A and 72C, A/D converter modules 74A and 74C, digital filter modules 76A and 76C, detector modules 78A and 78C and timing and gain control modules 80A and 80C are chosen to optimize drive performance under other conditions.

The outputs of detector modules 78A, 78B and 78C are respectively applied to buffer modules 48A, 48B and 48C. Although not shown in FIG. 7 for the sake of clarity, buffer modules 48A, 48B and 48C also respectively receive a timing control signal from timing and gain control modules 80A, 80B and 80C for clocking the outputs of detector modules 78A, 78B and 78C into and out of buffer modules 48A, 48B and 48C. The remaining portion of the multipath channel apparatus of this embodiment is identical in structure and operation to the first embodiment described above with reference to FIGS. 3 and 4, and thus description thereof is omitted to avoid repetition.

Figure 8A:
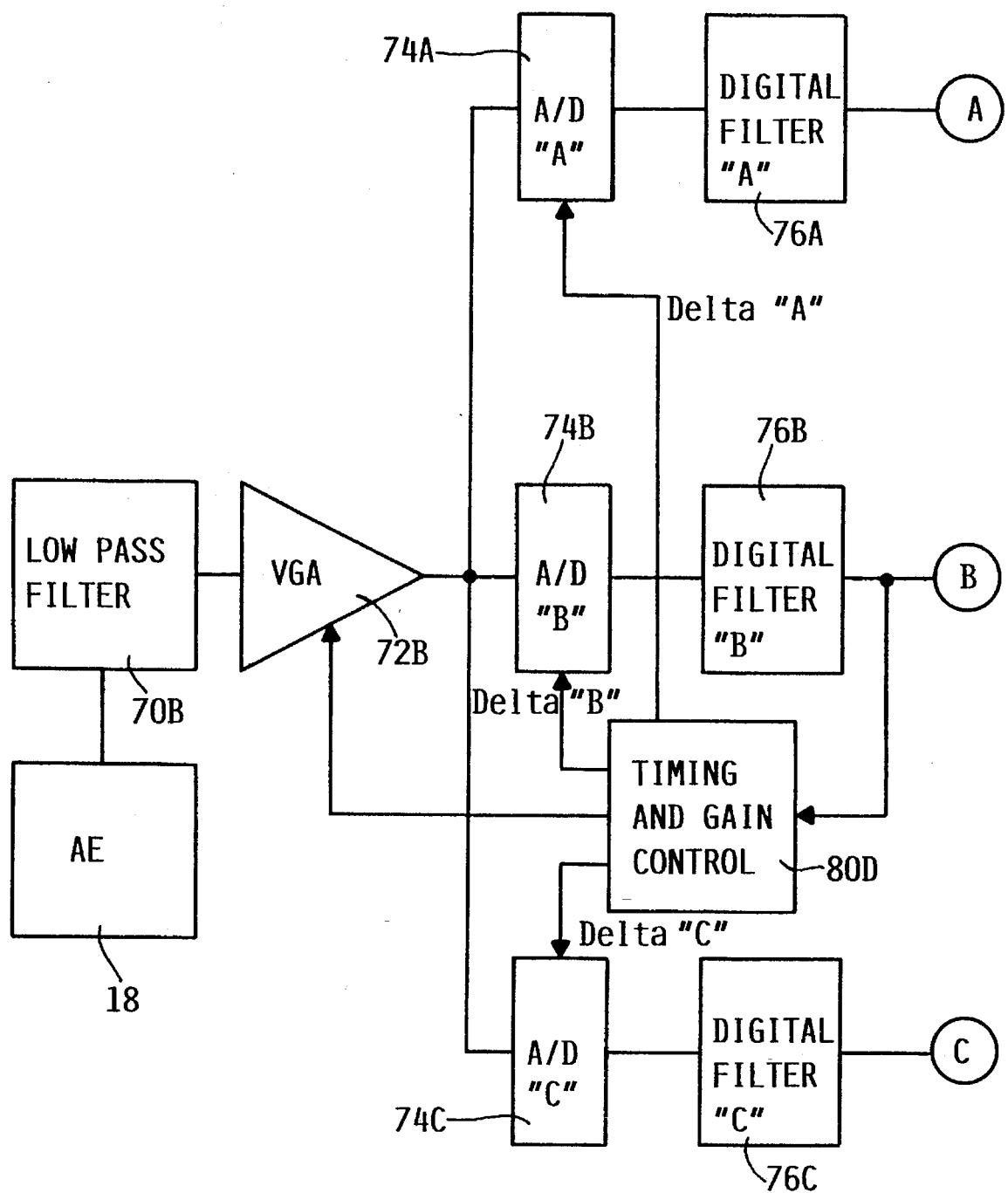
FIG. 8(A)–8(B) is a schematic block diagram of a multipath channel apparatus for a data storage device according to a fifth embodiment of the present invention using PRML data paths, wherein the data paths use a common low pass filter, a common variable gain amplifier (VGA) module and a common timing/gain control module.
Figure 8B:
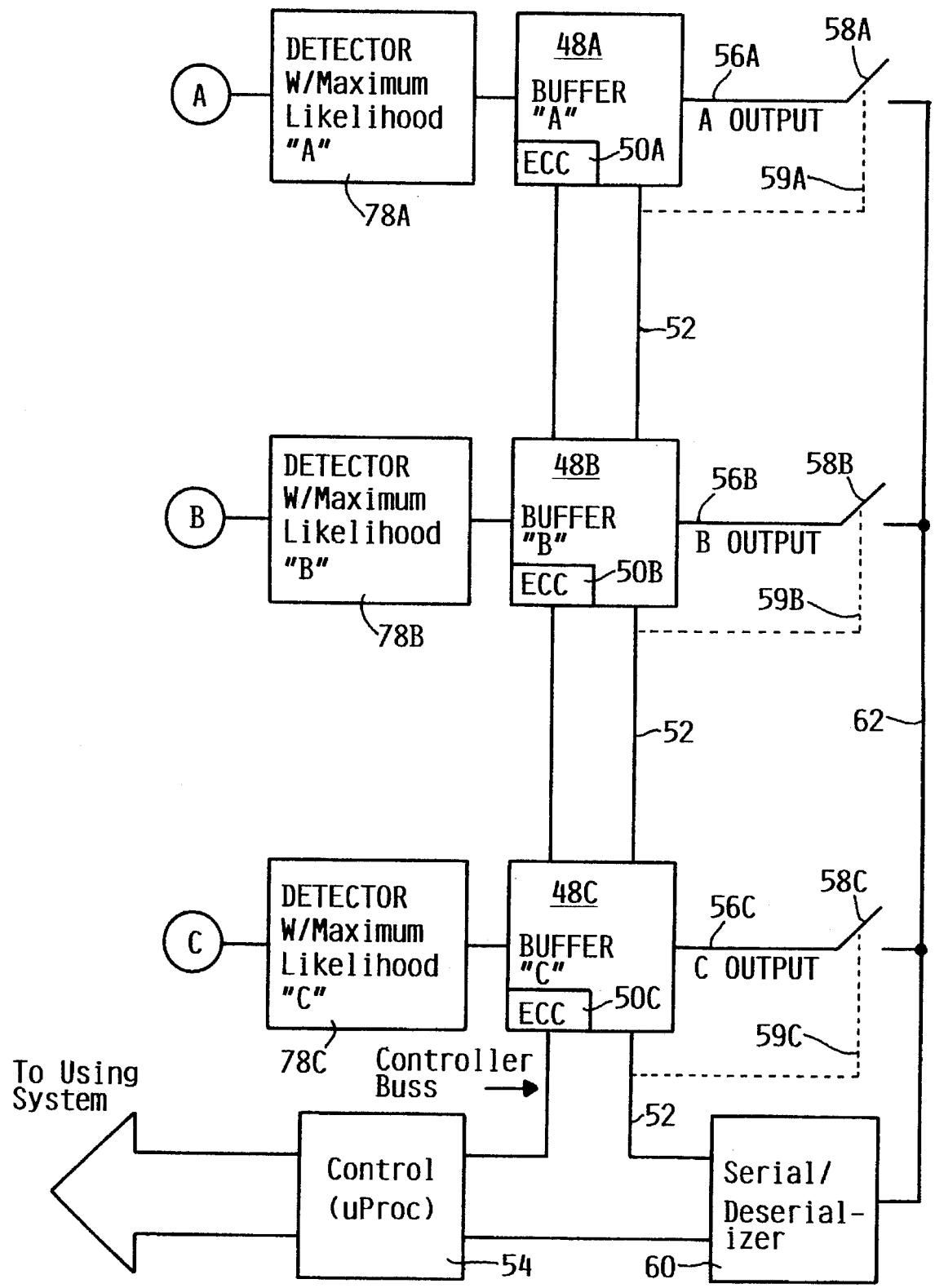

FIG. 8 is a schematic block diagram of a multipath channel apparatus for data storage devices according to a fifth embodiment of the present invention. The fifth embodiment is identical to the fourth embodiment shown in FIG. 7, except that each of the PRML data paths uses a common low pass filter module 70B, a common variable gain amplifier (VGA) module 72B and a common timing/gain control module 80D.

In the fifth embodiment, low pass filter module 70B receives the amplified read signal from AE module 18. The filtered read signal is applied to variable gain amplifier (VGA) module 72B. The amplified read signal is applied to analog to digital (A/D) converter modules 74A, 74B and 74C. Timing and gain control module 80D receives the filtered signals from digital filter module 76B, provides a gain and ac coupling pole control signal to VGA module 72B, and provides differing timing control signals to A/D modules 74A, 74B and 74C. Preferably, the timing control signal provided to A/D converter module 74B is centered, the timing control signal provided to A/D converter module 74A is offset earlier relative to center, and the timing control signal provided to A/D converter module is offset later relative to center. Although not shown in FIG. 8 for the sake of clarity, buffer modules 48A, 48B and 48C respectively a receive timing control signal from timing and gain control modules 80D for clocking in and out the outputs of detector modules 78A, 78B and 78C.

Figure 9:
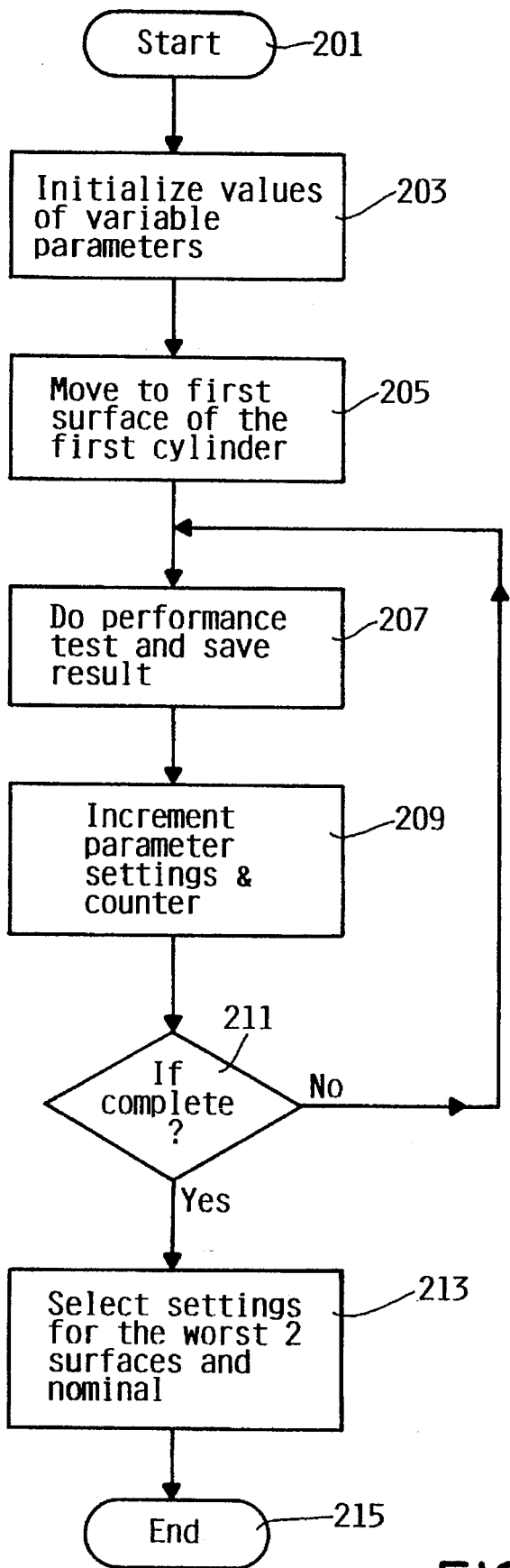
FIG. 9 is flow chart showing a procedure for selecting the values of module parameters for use in separate paths to optimize drive performance for a different condition in each of the separate paths.

FIG. 9 is flow chart showing a procedure for selecting the values of module parameters for use in separate paths to optimize disk drive performance for a different condition in each of the separate paths. The start of the parameter value selection procedure is denoted as step 201. In step 203, the values of the module parameters of a test path (not shown) in a testing apparatus (not shown) are initialized. The test path has modules (not shown) which are of the type used in each of the separate paths of the present invention. Parameters of the modules in the test path are variable to permit determination of optimum values under different conditions. In step 205, a test transducer (not shown) is moved to a first cylinder on a surface a first test disk (not shown), which surface is referred to as the "first surface" in FIG. 9. The test transducer and the test disks are of the type used in a disk drive that incorporates the separate paths of the present invention.

In step 207, the reading performance of the test path is tested, and the result saved in a memory (not shown) of the testing apparatus. In step 209, the parameters of the modules in the test path are incremented, as is a counter (not shown) of the testing apparatus. Steps 207 and 209 are repeated for each increment of the parameters. Only the steps 203–209 for testing using the first cylinder on the first surface are shown in FIG. 9. Although not shown in FIG. 9 to avoid repetition, steps 203-209 are repeated for the first cylinder on the surface of several other test disks, and preferably for other cylinders on the surface each of the test disks.

In step 211, the testing apparatus queries whether the testing is complete. After the testing is complete the parameter value selection procedure proceeds to step 213, where the testing apparatus selects a set of parameter values for use in each of the separate paths of the present invention based on the results stored in the memory. The parameter value selection procedure then ends in step 215. In step 213, one set of parameter values is selected for use in a first "nominal" path of the present invention because this set produced optimal results for the majority of the test disks, another set of parameter values is selected for use in a second path of the present invention because this set produced the best results for the test disk having the worst overall results, and yet another set of parameter values is selected for use in a third path of the present invention because this set produced the best results for the test disk having the second worst overall results.

The present invention can also be applied to data communications systems.

Figure 10A:
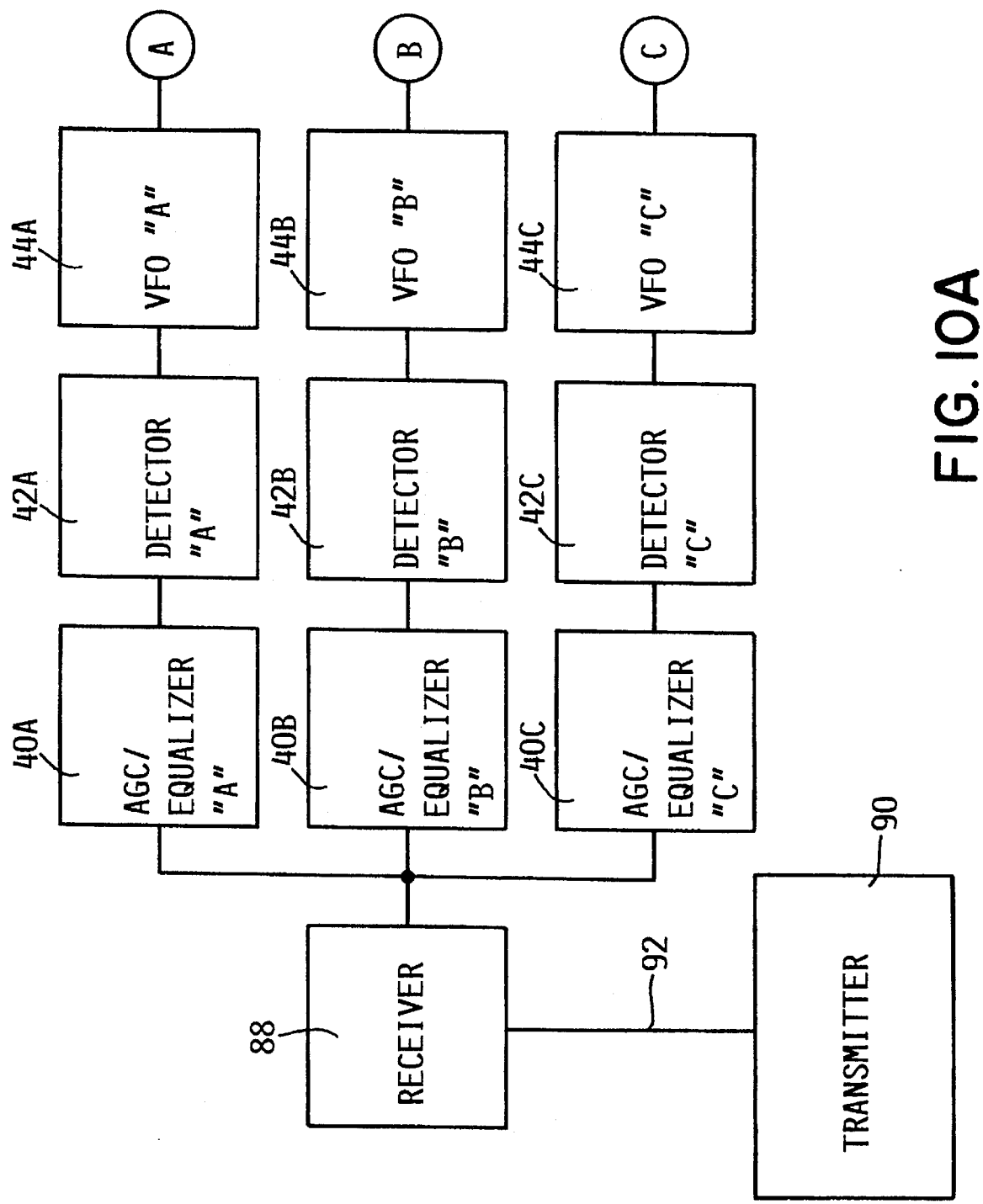
FIG. 10(A)–10(B) is a schematic block diagram of a multipath channel apparatus for a communications system according to a sixth embodiment of the present invention.
Figure 10B:
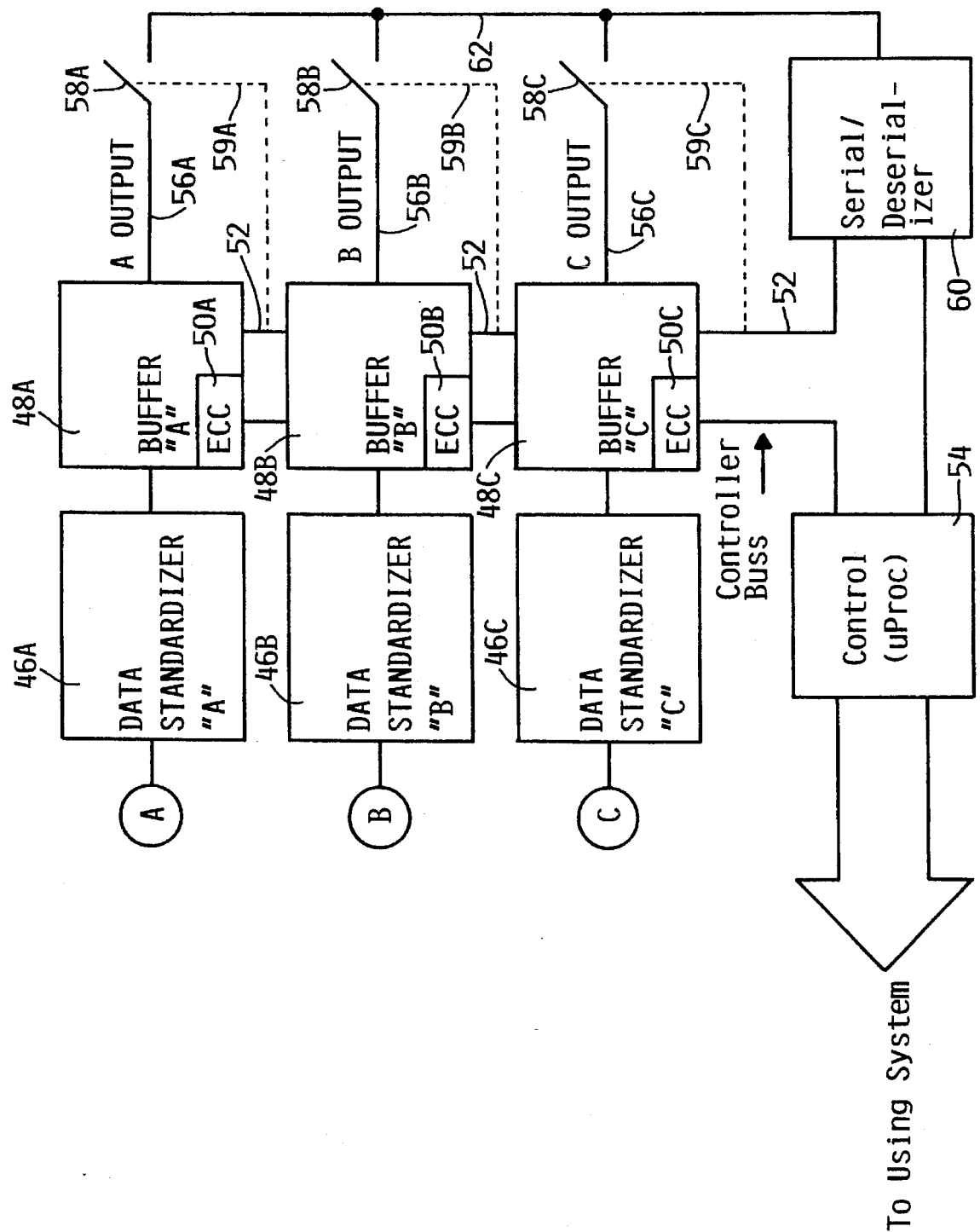

FIG. 10 is a schematic block diagram of a multipath channel apparatus for a communications system, e.g. a modem system, a closed circuit cable system or the like, according to a sixth embodiment of the present invention. The sixth embodiment is identical to the first embodiment shown in FIG. 3, except a receiver module 88, rather than AE module 18, receives a data signal from a transmitter module 90. As shown in FIG. 10, a communications line 92 may be used to transmit the data signal from transmitter module 90 to receiver module 92. Communications line 92 may be an optical fiber cable, an electrical conductor cable or the like. Alternatively, the data signal may be included in a signal broadcast from transmitter module 90 to receiver module 88, without the use of a communications line.

The receiver module 88 provides the initial high amplification of the data signal from transmitter module 90. Instead of the single receiver module 88 shown in FIG. 10, a separate receiver module may be incorporated in each path. Each such receiver module may separately receive base band data, for example. The remaining portion of the multipath channel apparatus of the sixth embodiment is identical in structure to the first embodiment described above with reference to FIG. 3, and thus description thereof is omitted to avoid repetition.

Figure 11A:
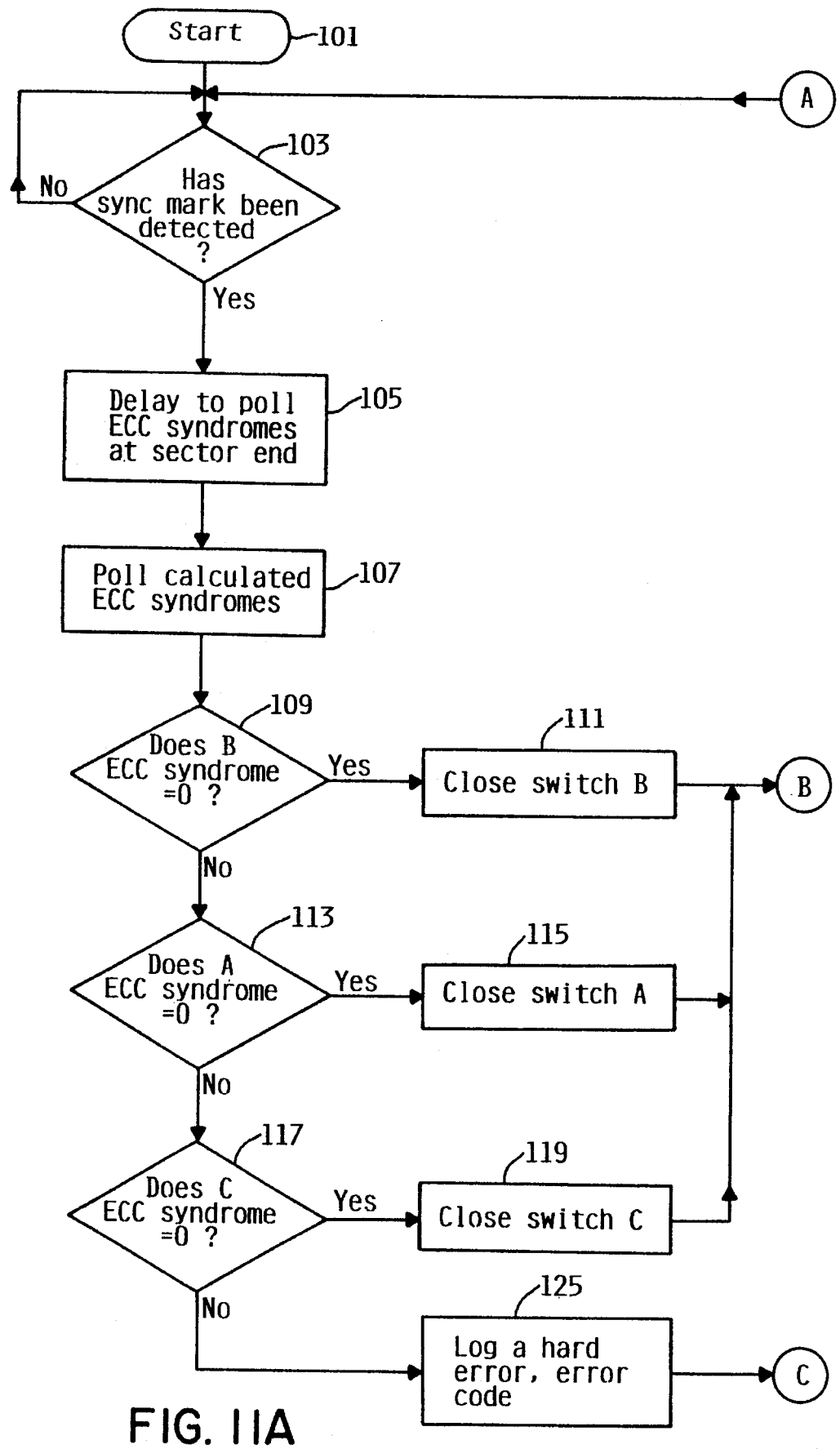
FIG. 11(A)–11(B) is a flow chart showing a polling procedure performed by the multipath channel apparatus shown in FIG. 10.
Figure 11B:
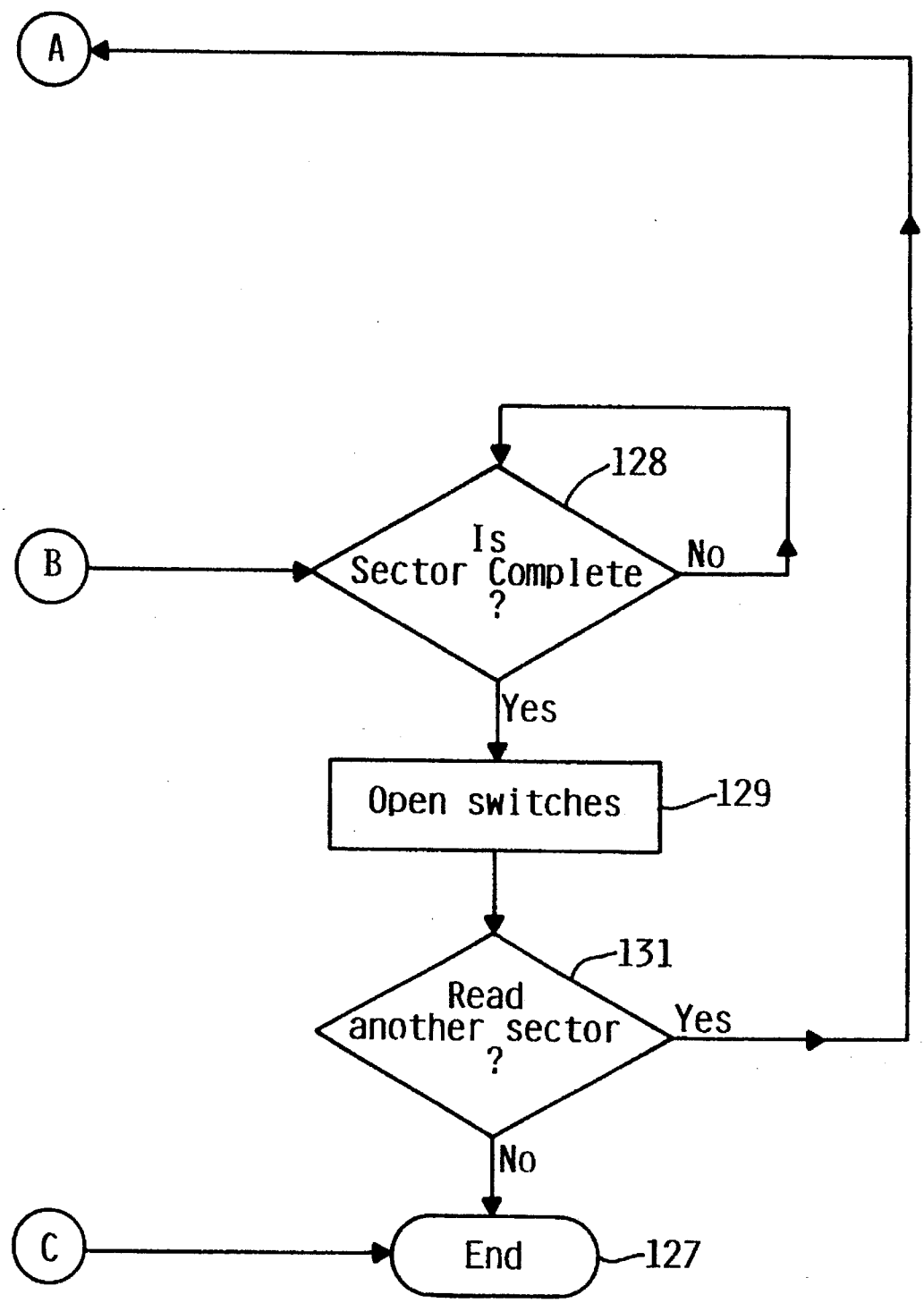

FIG. 11 is a flow chart showing a polling procedure performed by the multipath channel apparatus shown in FIG. 10. This polling procedure is identical to that shown in FIG. 4, except for the omission the DRP related steps 121 and 123, and thus description of the polling procedure shown in FIG. 11 is omitted to avoid repetition.

In FIGS. 10 and 11, it is assumed that the data signal transmitted from transmitter module 90 to receiver module 88 has the sector architecture byte allocation shown in FIG. 2. The present invention is not limited to use with the sector architecture byte allocation shown in FIG. 2, however, and can be used with any data communications architecture that includes redundant data such as an ECC, CRC or the like.

It will be recognized that other modifications and adaptations may be made. For example, some of the separate data paths may have different channel types. In one such implementation, a first data path may be a peak detect channel, while a second data path may be a partial response (PR) channel. In another such implementation, different PR types may be used in some of the separate data paths, e.g., a first data path may be a PR channel, while a second data path may be an extended enhanced partial response (EEPR) channel which works well for low resolution data signals.

It will be apparent to one of skill in the an that minor modifications may be made to the subject invention without departing from the scope on the invention as defined by the appended claims.

What is claimed is:

1. A multipath channel method for a data storage device wherein data is stored on a storage medium and is read from the storage medium by a transducer, said method comprising the steps of:

inputting data read by the transducer into a data channel having a plurality of data paths operatively connected to the transducer;

checking customer and redundancy data from each of said data paths for errors; and selecting data from one of said data paths based on said checking step;

wherein each of said data paths includes a data standardizer for standardizing data based on a read clock, each of said data paths includes a differing parameter value, said differing parameter value is an offset amount of said read clock, said read clock associated with a first one of said data paths is advanced relative to a reference clock, said offset amount of read clock associated with a second one of said data paths is zero so that said read clock associated with the second data path is equal to said reference clock, and said read clock associated with a third one of said data paths is delayed relative to said reference clock, and wherein said checking step includes the substeps of:

calculating an error correcting code syndrome for said customer and redundancy data from said second data path and comparing said calculated error correcting code syndrome for said customer and redundancy data from said second data path to zero;

if said calculated error correcting code syndrome for customer and redundancy data from said second data path does not equal zero, calculating an error correcting code syndrome for said customer and redundancy data from one of said first and third data paths and comparing said calculated error correcting code syndrome for said customer and redundancy data from said one of said first and third data paths to zero; and if neither said calculated error correcting code syndrome for customer and redundancy data from said second data path nor said calculated error correcting code syndrome for customer and redundancy data from said one of said first and third data path equals zero, calculating an error correcting code syndrome for said customer and redundancy data from the other of said first and third data paths and comparing said calculated error connecting code syndrome for said customer and redundancy data from said other of said first and third data paths to zero.

2. The multipath channel method as recited in claim 1, wherein the selecting step includes the substeps of:

selecting data from the second data path if said calculated error correcting code syndrome for said customer and redundancy data from said second data path is equal to zero;

selecting data from said one of the first and third data paths if said calculated error correcting code syndrome for said customer and redundancy data from said one of said first and third data paths is equal to zero; and selecting data from said other of the first and third data paths if said calculated error correcting code syndrome for said customer and redundancy data from said other of said first and third data paths is equal to zero.

3. A multipath channel method for a data storage device wherein data is stored on a storage medium and is read from the storage medium by a transducer, said method comprising the steps of:

inputting data read by the transducer into a data channel having a plurality of data paths operatively connected to the transducer;

checking customer and redundancy data from each of said data paths for errors; and selecting data from one of said data paths based on said checking step;

wherein each of said data paths includes a detector for detecting valid data peaks based on at least one of a delta-V value and a "V threshold", each of said data paths includes a differing parameter value, said differing parameter value is an offset amount of said at least one of said delta-V value and said "V threshold", said at least one of said delta-V value and said "V threshold" associated with a first one of said data paths is higher than a reference, said offset amount of said at least one of said delta-V value and said "V threshold" associated with a second one of said data paths is zero so that said at least one of said delta-V value and said "V threshold" associated with the second data path is equal to said reference, and said at least one of said delta-V value and said "V threshold" associated with a third one of said data paths is lower than said reference, and wherein said checking step includes the substeps of:

calculating an error correcting code syndrome for said customer and redundancy data from said second data path and comparing said calculated error correcting code syndrome for said customer and redundancy data from said second data path to zero;

if said calculated error connecting code syndrome for customer and redundancy data from said second data path does not equal zero, calculating an error connecting code syndrome for said customer and redundancy data from one of said first and third data paths and comparing said calculated error correcting code syndrome for said customer and redundancy data from said one of said first and third data paths to zero; and if neither said calculated error correcting code syndrome for customer and redundancy data from said second data path nor said calculated error correcting code syndrome for customer and redundancy data from said one of said first and third data path equals zero, calculating an error correcting code syndrome for said customer and redundancy data from the other of said first and third data paths and comparing said calculated error connecting code syndrome for said customer and redundancy data from said other of said first and third data paths to zero.

4. The multipath channel method as recited in claim 3, wherein the selecting step includes the substeps of:

selecting data from the second data path if said calculated error correcting code syndrome for said customer and redundancy data from said second data path is equal to zero;

selecting data from said one of the first and third data paths if said calculated error correcting code syndrome for said customer and redundancy data from said one of said first and third data paths is equal to zero; and selecting data from said other of the first and third data paths if said calculated error correcting code syndrome for said customer and redundancy data from said other of said first and third data paths is equal to zero.

\* \* \* \* \*